United States Patent
Hossain et al.

(10) Patent No.: US 12,149,542 B2
(45) Date of Patent: *Nov. 19, 2024

(54) METHOD, SYSTEM, AND COMPUTER PROGRAM PRODUCT FOR PROTOCOL PARSING FOR NETWORK SECURITY

(71) Applicant: Visa International Service Association, San Francisco, CA (US)

(72) Inventors: Md Mahmud Hossain, Lansdowne, VA (US); D M Shams Zawoad, Dublin, CA (US); Joel Partap Samaroo, Lyndhurst, NJ (US); Patrick Michael Crennen, Lakewood, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,472

(22) Filed: Jul. 26, 2023

(65) Prior Publication Data
US 2023/0388319 A1     Nov. 30, 2023

Related U.S. Application Data

(63) Continuation of application No. 17/232,738, filed on Apr. 16, 2021, now Pat. No. 11,743,270.

(51) Int. Cl.
*H04L 9/40*     (2022.01)
*G06Q 20/38*    (2012.01)

(52) U.S. Cl.
CPC ....... *H04L 63/1408* (2013.01); *G06Q 20/385* (2013.01); *H04L 63/0245* (2013.01); *H04L 63/20* (2013.01)

(58) Field of Classification Search
CPC . H04L 63/1408; H04L 63/0245; H04L 63/20; G06Q 20/385; G06Q 20/40
See application file for complete search history.

(56) References Cited

U.S. PATENT DOCUMENTS 5,696,765 A * 12/1997 Safadi ............... H04N 7/17309
                                            348/E5.006
6,651,099 B1    11/2003 Dietz et al.
(Continued)

FOREIGN PATENT DOCUMENTS

CA       2629280 A1 *  5/2007  ............ H04L 29/06
CN     101375264 A      2/2009
(Continued)

OTHER PUBLICATIONS

"Which layers in OSI model are known as lower layers?", "quora.com/Which-layers-in-OSI-model-are-known-as-lower-layers", retrieved Mar. 8, 2024 (Year: 2024).*

*Primary Examiner* — John B King
(74) *Attorney, Agent, or Firm* — The Webb Law Firm

(57) ABSTRACT

Provided is a method for protocol parsing for network security. The method may include receiving, by a packet capture system, a plurality of packets, parsing lower layer data from each packet, and communicating a respective payload of each respective packet to at least one first queue. A routing system may route the respective payload of each respective packet to a respective second queue of a plurality of second queues based on a respective protocol of the respective packet. A respective protocol parser node of a parsing system may parse higher layer data from the respective payload of each respective packet from each respective second queue. The packet capture system may communicate the lower layer data for each packet to a third queue, and the parsing system may communicate the higher layer data for each packet to the third queue. A system and computer program product are also disclosed.

20 Claims, 7 Drawing Sheets

(56) References Cited

U.S. PATENT DOCUMENTS

| | | |
|---|---|---|
| 8,745,185 B1 | 6/2014 | Salo |
| 8,756,337 B1 | 6/2014 | Canion et al. |
| 8,959,571 B2 | 2/2015 | Dan |
| 9,083,740 B1 | 7/2015 | Ma et al. |
| 9,413,726 B2 | 8/2016 | Zhou et al. |
| 10,505,747 B2 | 12/2019 | Pope et al. |
| 2001/0030970 A1 | 10/2001 | Wiryaman et al. |
| 2001/0043217 A1 | 11/2001 | Maloney et al. |
| 2002/0004796 A1 | 1/2002 | Vange et al. |
| 2004/0034800 A1 | 2/2004 | Singhal et al. |
| 2004/0059942 A1 | 3/2004 | Xie |
| 2004/0088425 A1 | 5/2004 | Rubinstein et al. |
| 2004/0198392 A1* | 10/2004 | Harvey ............... H04W 12/122 455/456.1 |
| 2005/0238022 A1 | 10/2005 | Panigrahy |
| 2006/0288208 A1* | 12/2006 | Dashora .................. H04L 63/08 713/167 |
| 2009/0328219 A1 | 12/2009 | Narayanaswamy |
| 2010/0054268 A1 | 3/2010 | Divivier |
| 2012/0042060 A1 | 2/2012 | Jackowski et al. |
| 2012/0243412 A1 | 9/2012 | Voruganti et al. |
| 2012/0269150 A1 | 10/2012 | Delorme et al. |
| 2013/0036451 A1* | 2/2013 | Fausak .................. H04L 63/164 726/3 |
| 2014/0173094 A1 | 6/2014 | Majumdar et al. |
| 2016/0337483 A1* | 11/2016 | Yang ..................... H04L 69/162 |
| 2017/0063786 A1 | 3/2017 | Petit et al. |
| 2018/0375836 A1 | 12/2018 | Salo |
| 2019/0132282 A1* | 5/2019 | Lei ....................... H04L 61/5076 |
| 2020/0403924 A1 | 12/2020 | Jiang et al. |

FOREIGN PATENT DOCUMENTS

| | | |
|---|---|---|
| CN | 112134915 A | 12/2020 |
| JP | 4745586 B2 | 8/2011 |

\* cited by examiner

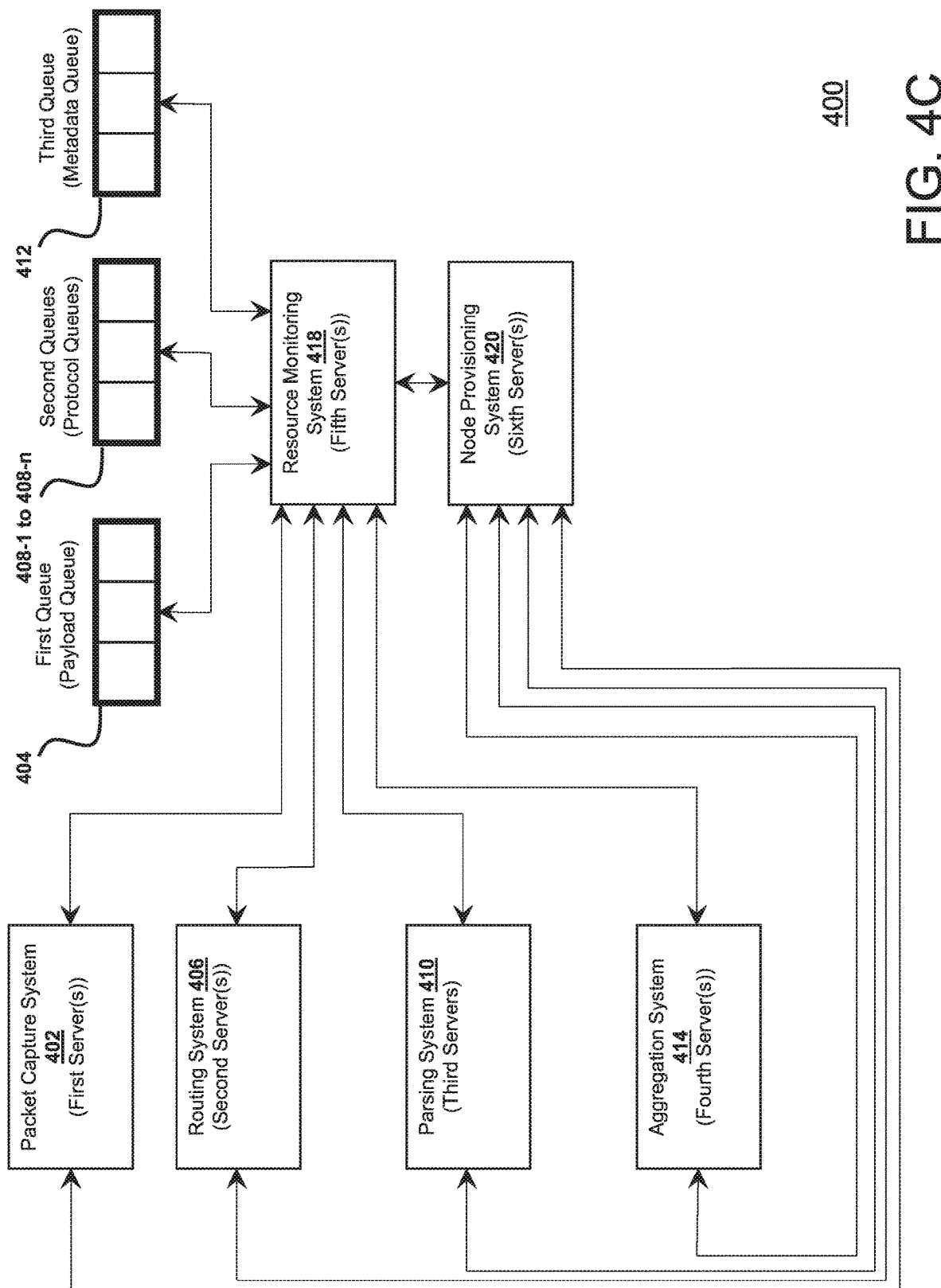

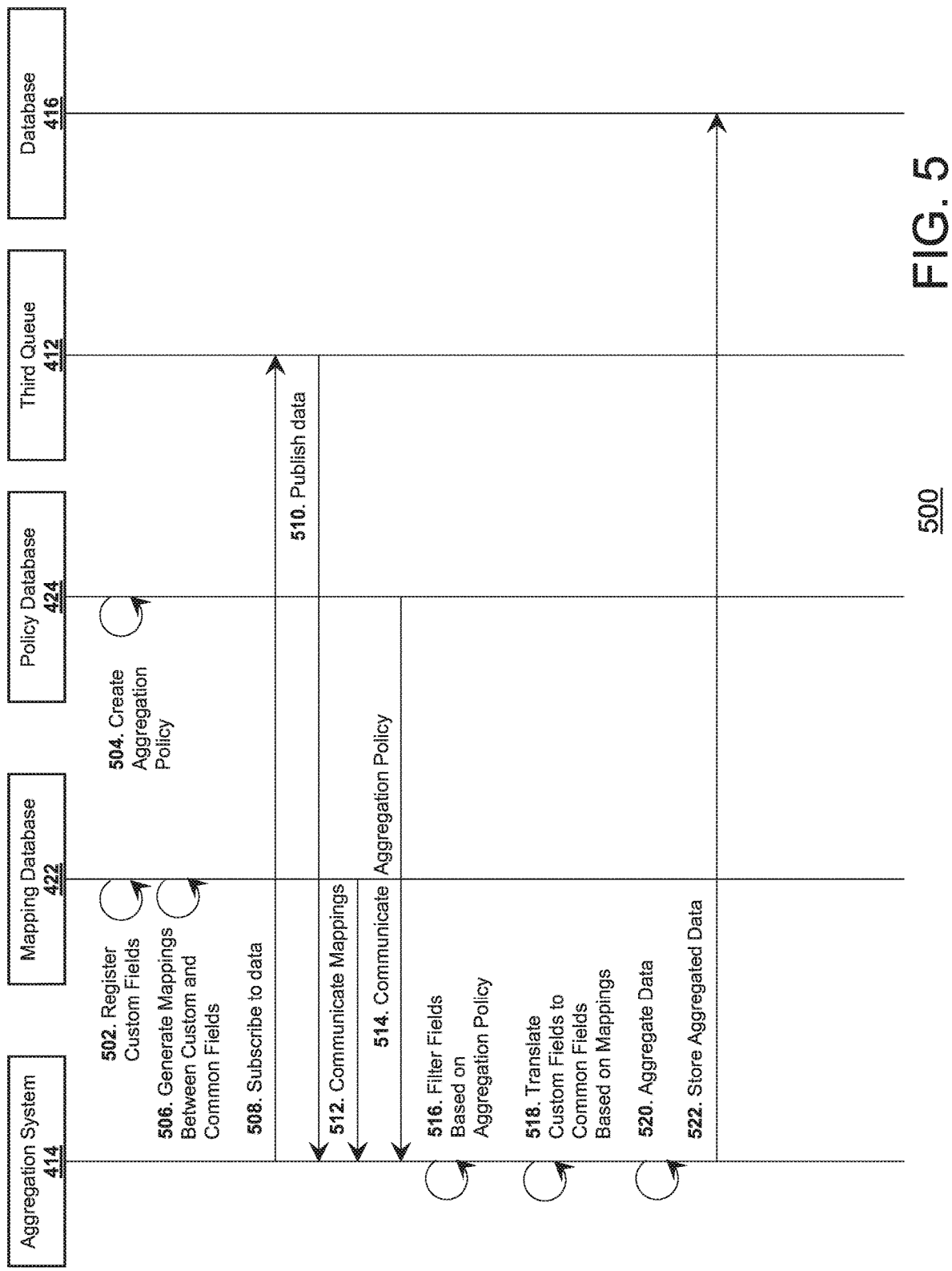

METHOD, SYSTEM, AND COMPUTER PROGRAM PRODUCT FOR PROTOCOL PARSING FOR NETWORK SECURITY

CROSS REFERENCE TO RELATED APPLICATIONS

This application is a continuation of U.S. patent application Ser. No. 17/232,738, filed on Apr. 16, 2021, the disclosure of which is incorporated by reference herein in its entirety.

BACKGROUND

1. Field

This disclosed subject matter relates generally to methods, systems, and products for protocol parsing and, in some particular embodiments or aspects, to a method, system, and computer program product for protocol parsing for network security.

2. Technical Considerations

Certain network monitoring systems (e.g., intrusion detection systems, deep packet inspection tools, and/or the like) read a variety of traffic using highly coupled parsers and analyzers (e.g., the parsers and analyzers embedded together in executable code and/or libraries (e.g., dynamic-link libraries (DLLs) and/or the like)) that are tied into capture nodes. For example, a network monitoring system (e.g., Arkime/Moloch, Suricata, Zeek/Bro, or the like) utilize multiple protocol parsers to analyze network packets. However, due to such coupling between capture nodes and the parsers/analyzers (e.g., libraries) thereof, a relatively large amount of overhead (e.g., computing resources, network resources, and/or the like) may be involved when building, extending, and/or deploying new parsers and analyzers. For example, when making a single change to one parser, all other parsers can be inadvertently affected, since parsers can share the same resource(s).

Furthermore, certain network monitoring systems may lack functionality to aggregate network metadata, such as lower and higher layer protocol and payload information, from multiple instances of a protocol parser developed by multiple vendors. Also, network monitoring systems may lack functionality to represent the fields of custom/vendor-specific metadata in a unified format or common fields. Due to such lacks, storage of metadata may be poorly utilized, detection and prevention of network intrusions may be inaccurate, and/or comprehensive forensic investigation of cyber-attacks may be difficult or unachievable. For example, if multiple vendors developed different parsers for the same higher layer (e.g., application layer) protocol (e.g., Hypertext Transfer Protocol (HTTP), Simple Mail Transfer Protocol (SMTP), Domain Name System (DNS), and/or the like), and if multiple instances of these parsers are deployed to parse network traffic, the parsers may produce network metadata which includes vendor-specific custom fields that vary from vendor to vendor. There may be redundancy in the values of the parsed data produced by vendor-specific protocol parsers, but the names of the fields of the parsed data may be different since such names may be defined by the individual vendors. When parsed data is stored in such heterogeneous formats in database, storage utilization may be poor since there are redundancies in the parsed data (e.g., wasting storage by storing redundant values in multiple fields). Moreover, the heterogeneous format (e.g., custom fields) of the parsed data may make provide difficulty for intrusion detection, prevention, and/or investigation systems to analyze parsed data from the network traffic to identify network anatomies as such systems would need to have custom logic to read custom/vendor-specific metadata. Further, network monitoring systems may not provide support to aggregate and encode parsed network metadata (e.g., which is stored in heterogeneous formats) into common formatting/fields.

Additionally, scaling of such network monitoring systems can be challenging. For example, protocol parsers analyze every network packet to extract information therefrom that can be used for intrusion prevention, intrusion detection, forensic investigation, or the like. Such systems can experience relatively few issues at a low data rate (e.g., received packets per second), but, as the amount of traffic received by the system (e.g., server(s) thereof) increases, issues arise. Such issues can include packet latency, packet drops/packet loss, operating system (OS) bottlenecks, and/or the like. For example, bottlenecks may be caused by protocol parsers being tightly coupled to a server, protocol parsers sharing computing resources (e.g., processor and/or memory resources) of the server, or the like. Moreover, such issues cannot easily be resolved without additional and often expensive hardware costs (e.g., adding more servers, such as high-performance servers and/or the like). Further, bottlenecks can exist in many places and can be highly coupled to the resources being used by the respective application. In addition, certain network monitoring systems may lack the capability to provision an individual additional protocol parser to cope with increased data rate (e.g., without provisioning an entire server instance, including additional analyzers and/or parsers that are unnecessary).

SUMMARY

Accordingly, it is an object of the presently disclosed subject matter to provide methods, systems, and computer program products for protocol parsing for network security that overcome some or all of the deficiencies identified above.

According to non-limiting embodiments or aspects, provided is a method for protocol parsing for network security. In some non-limiting embodiments or aspects, a method for protocol parsing for network security may include receiving, by a packet capture system, a plurality of packets. The packet capture system may parse at least one of data link layer data, network layer data, or transport layer data from each packet of the plurality of packets. The packet capture system may communicate a respective payload of each respective packet of the plurality of packets to at least one first queue. A routing system may route the respective payload of each respective packet of the plurality of packets to a respective second queue of a plurality of second queues based on a respective protocol of the respective packet. A respective protocol parser node of a parsing system may parse at least one of session layer data, presentation layer data, or application layer data from the respective payload of each respective packet from each respective second queue of the plurality of second queues. The packet capture system may communicate the at least one of the data link layer data, the network layer data, or the transport layer data for each packet of the plurality of packets to a third queue. The parsing system may communicate the at least one of the session layer data, the presentation layer data, or the application layer data for each packet of the plurality of packets to the third queue.

In some non-limiting embodiments or aspects, the packet capture system may include at least one first server. Additionally or alternatively, the routing system may include at least one second server. Additionally or alternatively, the parsing system may include a plurality of third servers. Additionally or alternatively, each respective protocol parser node may include a respective third server of the plurality of third servers.

In some non-limiting embodiments or aspects, each first server of the at least one first server may include a packet capture subsystem, a lower layer parser subsystem, and a protocol identifier subsystem. Additionally or alternatively, receiving the plurality of packets may include receiving, by the packet capture subsystem, the plurality of packets. Additionally or alternatively, parsing the at least one of the data link layer data, the network layer data, or the transport layer data from each packet may include parsing, by the lower layer parser subsystem, the at least one of the data link layer data, the network layer data, or the transport layer data from each packet of the plurality of packets. Additionally or alternatively, communicating the respective payload of each respective packet of the plurality of packets to the at least one first queue may include determining, by the protocol identifier subsystem, the respective protocol of each respective packet of the plurality of packets, and/or communicating, by the packet capture system, the respective payload of each respective packet of the plurality of packets with protocol data associated with the respective protocol of the respective packet to the at least one first queue.

In some non-limiting embodiments or aspects, each respective protocol parser node of the parsing system may be associated with a respective protocol of a plurality of protocols. Additionally or alternatively, each respective second queue of the plurality of second queues may be associated with one respective protocol parser node of the parsing system. Additionally or alternatively, routing each respective packet of the plurality of packets to the respective second queue of the plurality of second queues may include routing each respective packet of the plurality of packets to a selected one of the plurality of second queues based on the protocol data of the respective packet corresponding to the respective protocol of the one respective protocol parser node associated with the selected one of the plurality of second queues.

In some non-limiting embodiments or aspects, an aggregation system may aggregate the at least one of the data link layer data, the network layer data, or the transport layer data for each packet with the at least one of the session layer data, the presentation layer data, or the application layer data for each packet. Additionally or alternatively, the at least one of the data link layer data, the network layer data, or the transport layer data for each packet aggregated with the at least one of the session layer data, the presentation layer data, or the application layer data for each packet may be stored in a database.

In some non-limiting embodiments or aspects, the packet capture system may generate a respective packet identifier for each respective packet of the plurality of packets. Additionally or alternatively, communicating the respective payload of each respective packet of the plurality of packets to at least one first queue may include communicating the respective payload of each respective packet of the plurality of packets with the respective packet identifier of the respective packet. Additionally or alternatively, communicating the at least one of the data link layer data, the network layer data, or the transport layer data for each packet of the plurality of packets to the third queue may include communicating the at least one of the data link layer data, the network layer data, or the transport layer data for each packet of the plurality of packets with the respective packet identifier of the respective packet to the third queue. Additionally or alternatively, communicating the at least one of the session layer data, the presentation layer data, or the application layer data for each packet of the plurality of packets to the third queue may include communicating the at least one of the session layer data, the presentation layer data, or the application layer data for each packet of the plurality of packets with the respective packet identifier of the respective packet to the third queue. Additionally or alternatively, aggregating the at least one of the data link layer data, the network layer data, or the transport layer data for each packet with the at least one of the session layer data, the presentation layer data, or the application layer data for each packet may include aggregating the at least one of the data link layer data, the network layer data, or the transport layer data for each packet with the at least one of the session layer data, the presentation layer data, or the application layer data for each packet based on the respective packet identifier of the respective packet communicated with the at least one of the data link layer data, the network layer data, or the transport layer data matching the respective packet identifier of the respective packet communicated with the at least one of the session layer data, the presentation layer data, or the application layer data.

In some non-limiting embodiments or aspects, a mapping database may receive custom field data associated with a plurality of custom fields. Additionally or alternatively, the mapping database may generate a respective mapping between each respective custom field of the plurality of custom fields and a respective common field of a plurality of common fields. Additionally or alternatively, aggregating may include translating at least one of the data link layer data, the network layer data, the transport layer data, the session layer data, the presentation layer data, or the application layer data for a first packet of the plurality of packets based on the respective mapping of the respective custom field associated with the at least one of the data link layer data, the network layer data, the transport layer data, the session layer data, the presentation layer data, or the application layer data to the respective common field.

In some non-limiting embodiments or aspects, a policy database may receive aggregation policy data associated with at least one aggregation policy. Additionally or alternatively, aggregating may include filtering at least one field of a first packet of the plurality of packets based on the at least one aggregation policy.

In some non-limiting embodiments or aspects, the routing system may subscribe to topics of the first queue, and each respective topic of the topics may be associated with a respective protocol of a plurality of protocols. Additionally or alternatively, communicating the respective payload of each respective packet of the plurality of packets to at least one first queue may include publishing, in the first queue, each respective payload of each respective packet of the plurality of packets with the respective topic of the topics based on the respective protocol of the respective packet.

In some non-limiting embodiments or aspects, routing the respective payload of each respective packet of the plurality of packets may include publishing, in the respective second queue of the plurality of second queues, the respective payload of each respective packet of the plurality of packets based on the respective topic of the respective packet. Additionally or alternatively, parsing at least one of session layer data, presentation layer data, or application layer data from the respective payload of each respective packet may include consuming, by the respective protocol parser node of the parsing system, the respective payload of each respective packet from each respective second queue of the plurality of second queues.

In some non-limiting embodiments or aspects, a resource monitoring system may monitor the packet capture system, the routing system, the parsing system, the first queue, the plurality of second queues, and the third queue to provide respective metrics for each of the packet capture system, the routing system, the parsing system, the first queue, the second queue, and the third queue. Additionally or alternatively, a node provisioning system may determine whether to add or remove a node from at least one of the packet capture system, the routing system, or the parsing system based on at least one of the respective metrics for the packet capture system, the respective metrics for the routing system, the respective metrics for the parsing system, the respective metrics for the first queue, the respective metrics for the second queue, or the respective metrics for the third queue.

In some non-limiting embodiments or aspects, the resource monitoring system may include a packet capture system monitoring agent and the node provisioning system may include a packet capture system node provisioning system. Additionally or alternatively, the resource monitoring system may include a first queue monitoring agent and a routing system monitoring agent and the node provisioning system may include a routing system node provisioning system. Additionally or alternatively, the resource monitoring system may include a second queue monitoring agent and a parsing system monitoring agent and the node provisioning system may include a parsing system node provisioning system.

According to non-limiting embodiments or aspects, provided is a system for protocol parsing for network security. In some non-limiting embodiments or aspects, a system for protocol parsing for network security may include a packet capture system configured to receive a plurality of packets; parse at least one of data link layer data, network layer data, or transport layer data from each packet of the plurality of packets; communicate a respective payload of each respective packet of the plurality of packets to at least one first queue; and communicate the at least one of the data link layer data, the network layer data, or the transport layer data for each packet of the plurality of packets to a third queue. A routing system may be configured to route the respective payload of each respective packet of the plurality of packets to a respective second queue of a plurality of second queues based on a respective protocol of the respective packet. A parsing system may include a plurality of protocol parser node. Each respective protocol parser node may be configured to parse at least one of session layer data, presentation layer data, or application layer data from the respective payload of each respective packet from each respective second queue of the plurality of second queues; and communicate the at least one of the session layer data, the presentation layer data, or the application layer data for each packet of the plurality of packets to the third queue.

In some non-limiting embodiments or aspects, the packet capture system may include at least one first server, the routing system may include at least one second server, the parsing system may include a plurality of third servers, and/or each respective protocol parser node may include a respective third server of the plurality of third servers.

In some non-limiting embodiments or aspects, each first server of the at least one first server may include a packet capture subsystem, a lower layer parser subsystem, and a protocol identifier subsystem. Additionally or alternatively, receiving the plurality of packets may include receiving, by the packet capture subsystem, the plurality of packets. Additionally or alternatively, wherein parsing the at least one of the data link layer data, the network layer data, or the transport layer data from each packet may include parsing, by the lower layer parser subsystem, the at least one of the data link layer data, the network layer data, or the transport layer data from each packet of the plurality of packets. Additionally or alternatively, communicating the respective payload of each respective packet of the plurality of packets to the at least one first queue may include determining, by the protocol identifier subsystem, the respective protocol of each respective packet of the plurality of packets and communicating, by the packet capture system, the respective payload of each respective packet of the plurality of packets with protocol data associated with the respective protocol of the respective packet to the at least one first queue.

In some non-limiting embodiments or aspects, each respective protocol parser node of the parsing system may be associated with a respective protocol of a plurality of protocols. Additionally or alternatively, wherein each respective second queue of the plurality of second queues may be associated with one respective protocol parser node of the parsing system. Additionally or alternatively, routing each respective packet of the plurality of packets to the respective second queue of the plurality of second queues may include routing each respective packet of the plurality of packets to a selected one of the plurality of second queues based on the protocol data of the respective packet corresponding to the respective protocol of the one respective protocol parser associated with the selected one of the plurality of second queues.

In some non-limiting embodiments or aspects, an aggregation system may be configured to aggregate the at least one of the data link layer data, the network layer data, or the transport layer data for each packet with the at least one of the session layer data, the presentation layer data, or the application layer data for each packet and store, in a database, the at least one of the data link layer data, the network layer data, or the transport layer data for each packet aggregated with the at least one of the session layer data, the presentation layer data, or the application layer data for each packet.

In some non-limiting embodiments or aspects, a mapping database may be configured to receive custom field data associated with a plurality of custom fields and generate a respective mapping between each respective custom field of the plurality of custom fields and a respective common field of a plurality of common fields. Additionally or alternatively, a policy database may be configured to receive aggregation policy data associated with at least one aggregation policy. Additionally or alternatively, aggregating may include translating at least one of the data link layer data, the network layer data, the transport layer data, the session layer data, the presentation layer data, or the application layer data for a first packet of the plurality of packets based on the respective mapping of the respective custom field associated with the at least one of the data link layer data, the network layer data, the transport layer data, the session layer data, the presentation layer data, or the application layer data to the respective common field. Additionally or alternatively, aggregating may include filtering at least one field of a first packet of the plurality of packets based on the at least one aggregation policy.

In some non-limiting embodiments or aspects, a resource monitoring system may be configured to monitor the packet capture system, the routing system, the parsing system, the first queue, the plurality of second queues, and the third queue to provide respective metrics for each of the packet capture system, the routing system, the parsing system, the first queue, the second queue, and the third queue. Additionally or alternatively, a node provisioning system may be configured to determine whether to add or remove a node from at least one of the packet capture system, the routing system, or the parsing system based on at least one of the respective metrics for the packet capture system, the respective metrics for the routing system, the respective metrics for the parsing system, the respective metrics for the first queue, the respective metrics for the second queue, or the respective metrics for the third queue.

According to non-limiting embodiments or aspects, provided is a computer program product for protocol parsing for network security. In some non-limiting embodiments or aspects, a computer program product for protocol parsing for network security may include at least one non-transitory computer-readable medium including one or more instructions that, when executed by at least one processor, cause the at least one processor to receive a plurality of packets; parse at least one of data link layer data, network layer data, or transport layer data from each packet of the plurality of packets; communicate a respective payload of each respective packet of the plurality of packets to at least one first queue; route the respective payload of each respective packet of the plurality of packets to a respective second queue of a plurality of second queues based on a respective protocol of the respective packet; parse at least one of session layer data, presentation layer data, or application layer data from the respective payload of each respective packet from each respective second queue of the plurality of second queues; communicate the at least one of the data link layer data, the network layer data, or the transport layer data for each packet of the plurality of packets to a third queue; and communicate the at least one of the session layer data, the presentation layer data, or the application layer data for each packet of the plurality of packets to the third queue.

Further embodiments or aspects are set forth in the following numbered clauses:

Clause 1: A computer-implemented method, comprising: receiving, by a packet capture system, a plurality of packets; parsing, by the packet capture system, at least one of data link layer data, network layer data, or transport layer data from each packet of the plurality of packets; communicating, by the packet capture system, a respective payload of each respective packet of the plurality of packets to at least one first queue; routing, by a routing system, the respective payload of each respective packet of the plurality of packets to a respective second queue of a plurality of second queues based on a respective protocol of the respective packet; parsing, by a respective protocol parser node of a parsing system, at least one of session layer data, presentation layer data, or application layer data from the respective payload of each respective packet from each respective second queue of the plurality of second queues; communicating, by the packet capture system, the at least one of the data link layer data, the network layer data, or the transport layer data for each packet of the plurality of packets to a third queue; and communicating, by the parsing system, the at least one of the session layer data, the presentation layer data, or the application layer data for each packet of the plurality of packets to the third queue.

Clause 2: The method of clause 1, wherein the packet capture system comprises at least one first server, the routing system comprises at least one second server, the parsing system comprises a plurality of third servers, and each respective protocol parser node comprises a respective third server of the plurality of third servers.

Clause 3: The method of any preceding clause, wherein each first server of the at least one first server comprises a packet capture subsystem, a lower layer parser subsystem, and a protocol identifier subsystem, wherein receiving the plurality of packets comprises receiving, by the packet capture subsystem, the plurality of packets, wherein parsing the at least one of the data link layer data, the network layer data, or the transport layer data from each packet comprises parsing, by the lower layer parser subsystem, the at least one of the data link layer data, the network layer data, or the transport layer data from each packet of the plurality of packets, and wherein communicating the respective payload of each respective packet of the plurality of packets to the at least one first queue comprises: determining, by the protocol identifier subsystem, the respective protocol of each respective packet of the plurality of packets; and communicating, by the packet capture system, the respective payload of each respective packet of the plurality of packets with protocol data associated with the respective protocol of the respective packet to the at least one first queue.

Clause 4: The method of any preceding clause, wherein each respective protocol parser node of the parsing system is associated with a respective protocol of a plurality of protocols, wherein each respective second queue of the plurality of second queues is associated with one respective protocol parser node of the parsing system, and wherein routing each respective packet of the plurality of packets to the respective second queue of the plurality of second queues comprises routing each respective packet of the plurality of packets to a selected one of the plurality of second queues based on the protocol data of the respective packet corresponding to the respective protocol of the one respective protocol parser node associated with the selected one of the plurality of second queues.

Clause 5: The method of any preceding clause, further comprising: aggregating, by an aggregation system, the at least one of the data link layer data, the network layer data, or the transport layer data for each packet with the at least one of the session layer data, the presentation layer data, or the application layer data for each packet; and storing, in a database, the at least one of the data link layer data, the network layer data, or the transport layer data for each packet aggregated with the at least one of the session layer data, the presentation layer data, or the application layer data for each packet.

Clause 6: The method of any preceding clause, further comprising: generating, by the packet capture system, a respective packet identifier for each respective packet of the plurality of packets, wherein communicating the respective payload of each respective packet of the plurality of packets to at least one first queue comprises communicating the respective payload of each respective packet of the plurality of packets with the respective packet identifier of the respective packet, wherein communicating the at least one of the data link layer data, the network layer data, or the transport layer data for each packet of the plurality of packets to the third queue comprises communicating the at least one of the data link layer data, the network layer data, or the transport layer data for each packet of the plurality of packets with the respective packet identifier of the respective packet to the third queue, wherein communicating the at least one of the session layer data, the presentation layer data, or the application layer data for each packet of the plurality of packets to the third queue comprises communicating the at least one of the session layer data, the presentation layer data, or the application layer data for each packet of the plurality of packets with the respective packet identifier of the respective packet to the third queue, and wherein aggregating the at least one of the data link layer data, the network layer data, or the transport layer data for each packet with the at least one of the session layer data, the presentation layer data, or the application layer data for each packet comprises aggregating the at least one of the data link layer data, the network layer data, or the transport layer data for each packet with the at least one of the session layer data, the presentation layer data, or the application layer data for each packet based on the respective packet identifier of the respective packet communicated with the at least one of the data link layer data, the network layer data, or the transport layer data matching the respective packet identifier of the respective packet communicated with the at least one of the session layer data, the presentation layer data, or the application layer data.

Clause 7: The method of any preceding clause, further comprising: receiving, by a mapping database, custom field data associated with a plurality of custom fields; and generating, by the mapping database, a respective mapping between each respective custom field of the plurality of custom fields and a respective common field of a plurality of common fields, wherein aggregating comprises translating at least one of the data link layer data, the network layer data, the transport layer data, the session layer data, the presentation layer data, or the application layer data for a first packet of the plurality of packets based on the respective mapping of the respective custom field associated with the at least one of the data link layer data, the network layer data, the transport layer data, the session layer data, the presentation layer data, or the application layer data to the respective common field.

Clause 8: The method of any preceding clause, further comprising: receiving, by a policy database, aggregation policy data associated with at least one aggregation policy, wherein aggregating comprises filtering at least one field of a first packet of the plurality of packets based on the at least one aggregation policy.

Clause 9: The method of any preceding clause, further comprising: subscribing, by the routing system, to topics of the first queue, each respective topic of the topics associated with a respective protocol of a plurality of protocols, wherein communicating the respective payload of each respective packet of the plurality of packets to at least one first queue comprises publishing, in the first queue, each respective payload of each respective packet of the plurality of packets with the respective topic of the topics based on the respective protocol of the respective packet.

Clause 10: The method of any preceding clause, wherein routing the respective payload of each respective packet of the plurality of packets comprises publishing, in the respective second queue of the plurality of second queues, the respective payload of each respective packet of the plurality of packets based on the respective topic of the respective packet, and wherein parsing at least one of session layer data, presentation layer data, or application layer data from the respective payload of each respective packet comprises consuming, by the respective protocol parser node of the parsing system, the respective payload of each respective packet from each respective second queue of the plurality of second queues.

Clause 11: The method of any preceding clause, further comprising: monitoring, by a resource monitoring system, the packet capture system, the routing system, the parsing system, the first queue, the plurality of second queues, and the third queue to provide respective metrics for each of the packet capture system, the routing system, the parsing system, the first queue, the second queue, and the third queue; and determining, by a node provisioning system, whether to add or remove a node from at least one of the packet capture system, the routing system, or the parsing system based on at least one of the respective metrics for the packet capture system, the respective metrics for the routing system, the respective metrics for the parsing system, the respective metrics for the first queue, the respective metrics for the second queue, or the respective metrics for the third queue.

Clause 12: The method of any preceding clause, wherein at least one of: the resource monitoring system comprises a packet capture system monitoring agent and the node provisioning system comprises a packet capture system node provisioning system; the resource monitoring system comprises a first queue monitoring agent and a routing system monitoring agent and the node provisioning system comprises a routing system node provisioning system; or the resource monitoring system comprises a second queue monitoring agent and a parsing system monitoring agent and the node provisioning system comprises a parsing system node provisioning system.

Clause 13: A system comprising: a packet capture system configured to: receive a plurality of packets; parse at least one of data link layer data, network layer data, or transport layer data from each packet of the plurality of packets; communicate a respective payload of each respective packet of the plurality of packets to at least one first queue; and communicate the at least one of the data link layer data, the network layer data, or the transport layer data for each packet of the plurality of packets to a third queue; a routing system configured to route the respective payload of each respective packet of the plurality of packets to a respective second queue of a plurality of second queues based on a respective protocol of the respective packet; and a parsing system comprising a plurality of protocol parser nodes, each respective protocol parser node configured to: parse at least one of session layer data, presentation layer data, or application layer data from the respective payload of each respective packet from each respective second queue of the plurality of second queues; and communicate the at least one of the session layer data, the presentation layer data, or the application layer data for each packet of the plurality of packets to the third queue.

Clause 14: The system of clause 13, wherein the packet capture system comprises at least one first server, the routing system comprises at least one second server, the parsing system comprises a plurality of third servers, and each respective protocol parser node comprises a respective third server of the plurality of third servers.

Clause 15: The system of one of clauses 13 or 14, wherein each first server of the at least one first server comprises a packet capture subsystem, a lower layer parser subsystem, and a protocol identifier subsystem, wherein receiving the plurality of packets comprises receiving, by the packet capture subsystem, the plurality of packets, wherein parsing the at least one of the data link layer data, the network layer data, or the transport layer data from each packet comprises parsing, by the lower layer parser subsystem, the at least one of the data link layer data, the network layer data, or the transport layer data from each packet of the plurality of packets, and wherein communicating the respective payload of each respective packet of the plurality of packets to the at least one first queue comprises: determining, by the protocol identifier subsystem, the respective protocol of each respective packet of the plurality of packets; and communicating, by the packet capture system, the respective payload of each respective packet of the plurality of packets with protocol data associated with the respective protocol of the respective packet to the at least one first queue.

Clause 16: The system of any one of clauses 13-15, wherein each respective protocol parser node of the parsing system is associated with a respective protocol of a plurality of protocols, wherein each respective second queue of the plurality of second queues is associated with one respective protocol parser node of the parsing system, and wherein routing each respective packet of the plurality of packets to the respective second queue of the plurality of second queues comprises routing each respective packet of the plurality of packets to a selected one of the plurality of second queues based on the protocol data of the respective packet corresponding to the respective protocol of the one respective protocol parser associated with the selected one of the plurality of second queues.

Clause 17: The system of any one of clauses 13-16, further comprising an aggregation system configured to: aggregate the at least one of the data link layer data, the network layer data, or the transport layer data for each packet with the at least one of the session layer data, the presentation layer data, or the application layer data for each packet; and store, in a database, the at least one of the data link layer data, the network layer data, or the transport layer data for each packet aggregated with the at least one of the session layer data, the presentation layer data, or the application layer data for each packet.

Clause 18: The system of any one of clauses 13-17, further comprising: a mapping database configured to: receive custom field data associated with a plurality of custom fields; and generate a respective mapping between each respective custom field of the plurality of custom fields and a respective common field of a plurality of common fields; and a policy database configured to receive aggregation policy data associated with at least one aggregation policy, wherein aggregating comprises translating at least one of the data link layer data, the network layer data, the transport layer data, the session layer data, the presentation layer data, or the application layer data for a first packet of the plurality of packets based on the respective mapping of the respective custom field associated with the at least one of the data link layer data, the network layer data, the transport layer data, the session layer data, the presentation layer data, or the application layer data to the respective common field, and wherein aggregating comprises filtering at least one field of a first packet of the plurality of packets based on the at least one aggregation policy.

Clause 19: The system of any one of clauses 13-18, further comprising: a resource monitoring system configured to monitor the packet capture system, the routing system, the parsing system, the first queue, the plurality of second queues, and the third queue to provide respective metrics for each of the packet capture system, the routing system, the parsing system, the first queue, the second queue, and the third queue; and a node provisioning system configured to determine whether to add or remove a node from at least one of the packet capture system, the routing system, or the parsing system based on at least one of the respective metrics for the packet capture system, the respective metrics for the routing system, the respective metrics for the parsing system, the respective metrics for the first queue, the respective metrics for the second queue, or the respective metrics for the third queue.

Clause 20: A computer program product comprising at least one non-transitory computer-readable medium including one or more instructions that, when executed by at least one processor, cause the at least one processor to: receive a plurality of packets; parse at least one of data link layer data, network layer data, or transport layer data from each packet of the plurality of packets; communicate a respective payload of each respective packet of the plurality of packets to at least one first queue; route the respective payload of each respective packet of the plurality of packets to a respective second queue of a plurality of second queues based on a respective protocol of the respective packet; parse at least one of session layer data, presentation layer data, or application layer data from the respective payload of each respective packet from each respective second queue of the plurality of second queues; communicate the at least one of the data link layer data, the network layer data, or the transport layer data for each packet of the plurality of packets to a third queue; and communicate the at least one of the session layer data, the presentation layer data, or the application layer data for each packet of the plurality of packets to the third queue.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIGS. 4A-4C are diagrams of a non-limiting embodiment or aspect of an implementation relating to a non-limiting embodiment or aspect of the process shown in FIG. 3 according to the principles of the presently disclosed subject matter; and FIG. 5 is a swimlane diagram of a non-limiting embodiment or aspect of an implementation relating to a non-limiting embodiment or aspect of the process shown in FIG. 3 according to the principles of the presently disclosed subject matter.

DESCRIPTION

Figure 1:
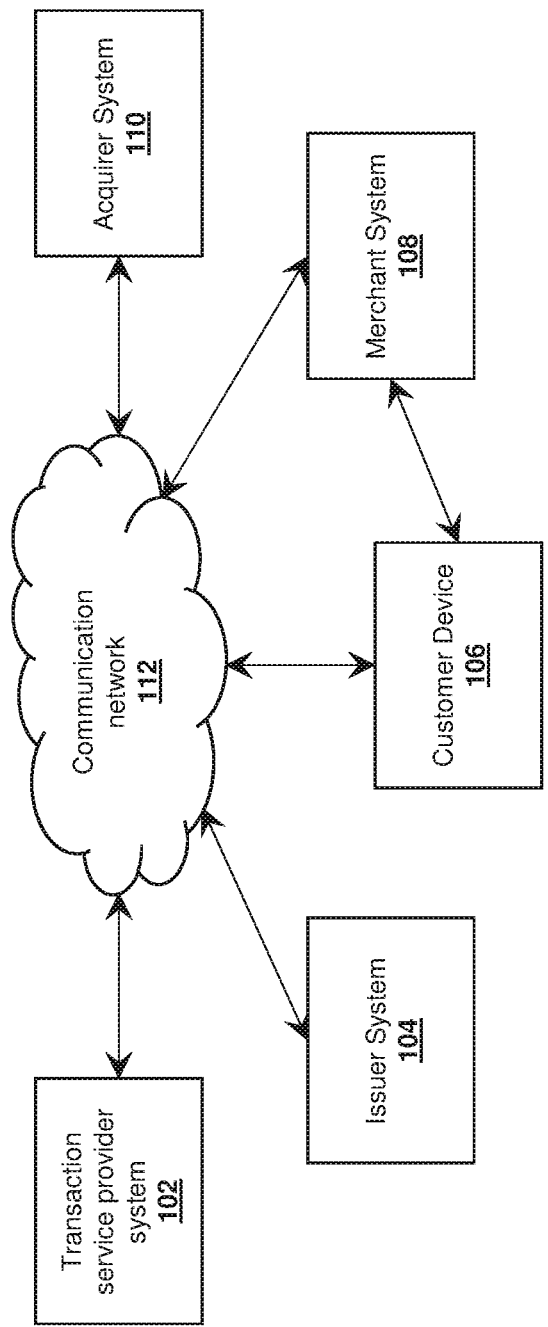
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers.

In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "computing device" may refer to one or more electronic devices that are configured to directly or indirectly communicate with or over one or more networks. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface. As used herein, the term "server" may refer to or include one or more processors or computers, storage devices, or similar computer arrangements that are operated by or facilitate communication and/or processing in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

The term "processor," as used herein, may represent any type of processing unit, such as a single processor having one or more cores, one or more cores of one or more processors, multiple processors each having one or more cores, and/or other arrangements and combinations of processing units.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for protocol parsing, including, but not limited to, protocol (e.g., application layer protocol) parsing for network security. For example, non-limiting embodiments or aspects of the disclosed subject matter provide a packet capture system to parse lower layer data (e.g., data link layer data, network layer data, and/or transport layer data) from packets and communicate at least a portion (e.g., payload and/or the like) of each packet to a first queue (e.g., payload queue), a routing system to route the portions (e.g., payloads) of the packets to respective second queues (e.g., protocol-based queues), and a parsing system including protocol parser nodes to parse higher layer data (e.g., session layer data, presentation layer data, or application layer data) from the portions (e.g., payloads) of the packets based on the respective protocol of each packet and to communicate the higher layer data to a third queue (e.g., metadata queue) to be aggregated with the lower layer data. Such embodiments provide techniques and systems that enable decoupling packet capture/lower layer analyzers from protocol parsers. As such, relatively low overhead (e.g., computing resources, network resources, and/or the like) may be involved when building, extending, updating, and/or deploying analyzers and/or parsers. This may allow for faster and/or continuous building, extending, updating, and/or deploying analyzers and/or parsers. Additionally or alternatively, such embodiments provide techniques and systems that provide deploying packet capture and/or a lower layer analyzer on one server and protocol parsers on other (separate) server(s). Additionally or alternatively, such embodiments provide techniques and systems that enable aggregating higher layer data from a plurality of different protocol parsers (e.g., for different application layer protocols) and lower layer data from separate lower layer analyzers via the third message queue. Additionally or alternatively, such embodiments provide techniques and systems that enable scaling (e.g., deploying additional packet capture system nodes, routing system nodes, parsing system nodes, and/or the like; removing under-utilized nodes; any combination thereof; and/or the like) relatively easily, since the nodes of each system are independent (e.g., decoupled). For example, the utilization of resources (e.g., computing resources, network resources, data rate (e.g., packets in per second, packets out per second, and/or the like), packet drops, and/or the like) of each system and/or the nodes thereof can be monitored (e.g., by at least one resource monitoring system and/or an agent thereof) and new nodes can be provisioned accordingly (e.g., by a node provisioning system and/or the like). As such, packet drops may be reduced and/or parsing/aggregation of data may be quickened. Additionally or alternatively, such embodiments provide techniques and systems that enable translating custom fields (e.g., protocol-specific fields, vendor-specific fields, and/or the like) from the different protocol parsers to common fields (e.g., when aggregating data from the third queue). Additionally or alternatively, such embodiments provide techniques and systems that enable filtering certain fields (e.g., protocol-specific fields, vendor-specific fields, and/or the like) from the different protocol parsers (e.g., when aggregating data from the third queue), which may allow for more efficient use of memory/storage, since unnecessary fields are eliminated. As such, enrichment of the data from the third queue may be achieved. Additionally or alternatively, such embodiments provide techniques and systems that enable faster threat (e.g., intrusion) detection since more data from different protocol parsers and lower layer analyzers may be aggregated faster. As such, the time to detect, investigate, and remediate threats can be reduced.

For the purpose of illustration, in the following description, while the presently disclosed subject matter is described with respect to methods, systems, and computer program products for protocol parsing, e.g., for network security, one skilled in the art will recognize that the disclosed subject matter is not limited to the illustrative embodiments or aspects. For example, the methods, systems, and computer program products described herein may be used with a wide variety of settings, such as protocol parsing in any setting suitable for using various different (application layer) protocols, e.g., cloud computing, software as a service (SaaS), and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and communication network 112.

Transaction service provider system 102 may include one or more devices capable of receiving information from and/or communicating information to issuer system 104, customer device 106, merchant system 108, and/or acquirer system 110 via communication network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via communication network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via communication network 112. Additionally or alternatively, each customer device 106 may include a device capable of receiving information from and/or communicating information to other customer devices 106 via communication network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via communication network 112. Merchant system 108 may also include a device capable of receiving information from customer device 106 via communication network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via communication network 112, the communication connection, and/or the like.

In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via communication network 112. For example, acquirer system 110 may include a computing device, a server, a group of servers, and/or the like. In some non-limiting embodiments or aspects, acquirer system 110 may be associated with an acquirer as described herein.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 106, a POS device of merchant system 108, and/or the like) may initiate the transaction, e.g., by generating an authorization request. Additionally or alternatively, the client device (e.g., customer device 106, at least on device of merchant system 108, and/or the like) may communicate the authorization request. For example, customer device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereof. In some non-limiting embodiments or aspects, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or customer device 106. Additionally or alternatively, acquirer system 110 may communicate the authorization response to merchant system 108 and/or a payment gateway. Additionally or alternatively, a payment gateway may communicate the authorization response to merchant system 108 and/or customer device 106. Additionally or alternatively, merchant system 108 may communicate the authorization response to customer device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 106 and/or the like) and/or transaction data associated with the transaction. For example, merchant system 108 (e.g., a client device of merchant system 108, a POS device of merchant system 108, and/or the like) may initiate the transaction, e.g., by generating an authorization request (e.g., in response to receiving the account identifier from a portable financial device of the customer and/or the like). Additionally or alternatively, merchant system 108 may communicate the authorization request to acquirer system 110. Additionally or alternatively, acquirer system 110 may communicate the authorization request to transaction service provider system 102. Additionally or alternatively, transaction service provider system 102 may communicate the authorization request to issuer system 104. Issuer system 104 may determine an authorization decision (e.g., authorize, decline, and/or the like) based on the authorization request, and/or issuer system 104 may generate an authorization response based on the authorization decision and/or the authorization request. Additionally or alternatively, issuer system 104 may communicate the authorization response to transaction service provider system 102. Additionally or alternatively, transaction service provider system 102 may communicate the authorization response to acquirer system 110, which may communicate the authorization response to merchant system 108.

For the purpose of illustration, clearing and/or settlement of a transaction may include generating a message (e.g., clearing message, settlement message, and/or the like) based on an account identifier of a customer (e.g., associated with customer device 106 and/or the like) and/or transaction data associated with the transaction. For example, merchant system 108 may generate at least one clearing message (e.g., a plurality of clearing messages, a batch of clearing messages, and/or the like). Additionally or alternatively, merchant system 108 may communicate the clearing message(s) to acquirer system 110. Additionally or alternatively, acquirer system 110 may communicate the clearing message(s) to transaction service provider system 102. Additionally or alternatively, transaction service provider system 102 may communicate the clearing message(s) to issuer system 104. Additionally or alternatively, issuer system 104 may generate at least one settlement message based on the clearing message(s). Additionally or alternatively, issuer system 104 may communicate the settlement message(s) and/or funds to transaction service provider system 102 (and/or a settlement bank system associated with transaction service provider system 102). Additionally or alternatively, transaction service provider system 102 (and/or the settlement bank system) may communicate the settlement message(s) and/or funds to acquirer system 110, which may communicate the settlement message(s) and/or funds to merchant system 108 (and/or an account associated with merchant system 108).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
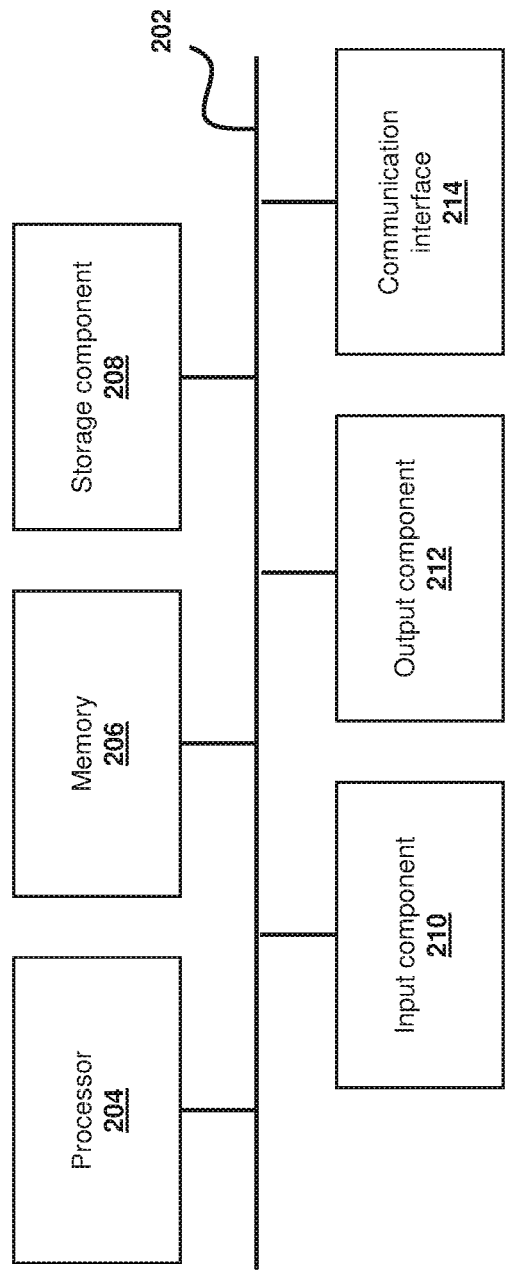
FIG. 2 is a diagram of a non-limiting embodiment or aspects of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
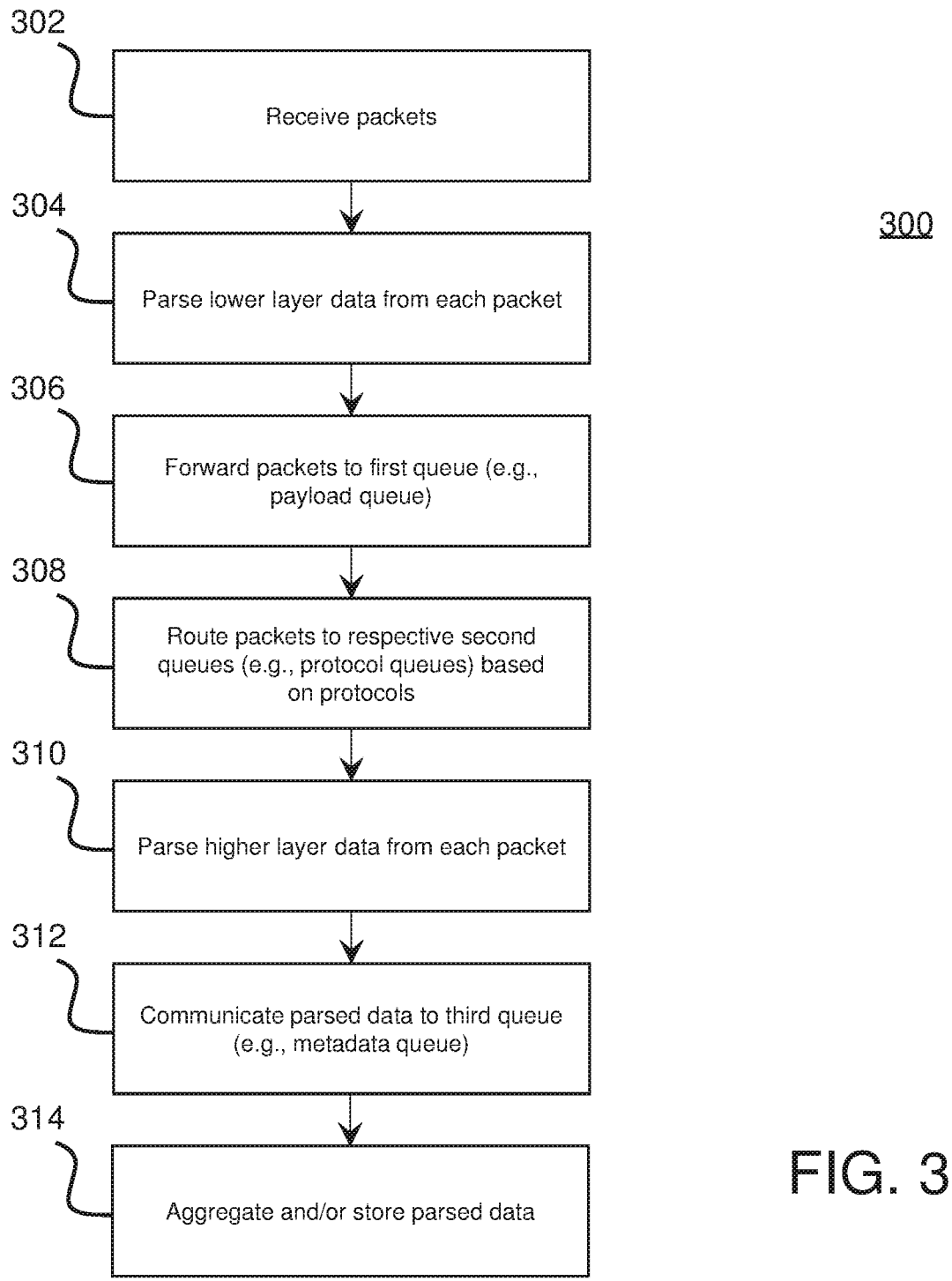
FIG. 3 is a flowchart of a non-limiting embodiment or aspect of a process for protocol parsing according to the principles of the presently disclosed subject matter.

Referring now to FIG. 3, FIG. 3 is a flowchart of a non-limiting embodiment or aspect of a process 300 for protocol parsing. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104, customer device 106, merchant system 108, acquirer system 110, and/or the like. In some non-limiting embodiments or aspects, with reference to FIG. 3, a packet capture system may include and/or be part of at least one computing device, such as at least one server (e.g., first server(s)) or a partition thereof. Additionally or alternatively, a packet capture system may be the same as or similar to packet capture system 402. In some non-limiting embodiments or aspects, with reference to FIG. 3, a first queue may include and/or be part of at least one computing device, such as a message queue (e.g., Kafka and/or the like), a first in, first out (FIFO) queue, a priority queue, at least one server or a partition thereof, a database, any combination thereof, and/or the like. Additionally or alternatively, the first queue may be the same as or similar to first queue 404. In some non-limiting embodiments or aspects, with reference to FIG. 3, a routing system may include and/or be part of at least one computing device, such as at least one server (e.g., second server(s)) or a partition thereof. Additionally or alternatively, the routing system may be the same as or similar to routing system 406. In some non-limiting embodiments or aspects, with reference to FIG. 3, second queues may include and/or be part of at least one computing device, such as a message queue, a FIFO queue, a priority queue, at least one server or a partition thereof, a database, any combination thereof, and/or the like. Additionally or alternatively, the second queues may be the same as or similar to second queues 408. In some non-limiting embodiments or aspects, with reference to FIG. 3, a parsing system may include and/or be part of at least one computing device, such as at least one server (e.g., third server(s)) or a partition thereof. Additionally or alternatively, the parsing system may be the same as or similar to parsing system 410. In some non-limiting embodiments or aspects, with reference to FIG. 3, a third queue may include and/or be part of at least one computing device, such as a message queue, a FIFO queue, a priority queue, at least one server or a partition thereof, a database, any combination thereof, and/or the like. Additionally or alternatively, the third queue may be the same as or similar to third queue 412. In some non-limiting embodiments or aspects, with reference to FIG. 3, an aggregation system may include and/or be part of at least one computing device, such as at least one server (e.g., fourth server(s)) or a partition thereof. Additionally or alternatively, the aggregation system may be the same as or similar to aggregation system 414. In some non-limiting embodiments or aspects, with reference to FIG. 3, a database may include and/or be part of at least one computing device, such as at least one server or a partition thereof, a database (e.g., a structured query language (SQL) database, a non-SQL database, a relational database, a non-relational database, a distributed database, and/or the like), any combination thereof, and/or the like. Additionally or alternatively, the database may be the same as or similar to database 416. In some non-limiting embodiments or aspects, with reference to FIG. 3, a resource monitoring system may include and/or be part of at least one computing device, such as at least one server (e.g., fifth server(s)) or a partition thereof. Additionally or alternatively, the resource monitoring system may be the same as or similar to resource monitoring system 418. In some non-limiting embodiments or aspects, with reference to FIG. 3, a node provisioning system may include and/or be part of at least one computing device, such as at least one server (e.g., sixth server(s)) or a partition thereof. Additionally or alternatively, the node provisioning system may be the same as or similar to node provisioning system 420. In some non-limiting embodiments or aspects, with reference to FIG. 3, a mapping database may include and/or be part of at least one computing device, such as at least one server or a partition thereof, a database (e.g., an SQL database, a non-SQL database, a relational database, a non-relational database, a distributed database, and/or the like), any combination thereof, and/or the like. Additionally or alternatively, the mapping database may be the same as or similar to mapping database 422. In some non-limiting embodiments or aspects, with reference to FIG. 3, a policy database may include and/or be part of at least one computing device, such as at least one server or a partition thereof, a database (e.g., an SQL database, a non-SQL database, a relational database, a non-relational database, a distributed database, and/or the like), any combination thereof, and/or the like. Additionally or alternatively, the policy database may be the same as or similar to policy database 424.

As shown in FIG. 3, at step 302, process 300 may include receiving packets. For example, the packet capture system may receive a plurality of packets (e.g., from a communication network, such as communication network 112 and/or the like, and/or a network tap connected thereto).

In some non-limiting embodiments or aspects, the packet capture system may include at least one first server. Additionally or alternatively, each first server of the plurality of first servers may include at least one of a packet capture subsystem, a lower layer parser subsystem, a protocol identifier subsystem, any combination thereof, and/or the like. For example, each first server may include a packet capture subsystem. In some non-limiting embodiments or aspects, receiving the plurality of packets may include receiving, by the packet capture subsystem, the plurality of packets (e.g., from a communication network, such as communication network 112 and/or the like, and/or a network tap connected thereto).

As shown in FIG. 3, at step 304, process 300 may include parsing lower layer data (e.g., data link layer data, network layer data, and/or transport layer data) from each packet. For example, the packet capture system may parse at least one of data link layer data, network layer data, transport layer data, any combination thereof, and/or the like from each packet of the plurality of packets. In some non-limiting embodiments or aspects, parsing the lower layer data may include parsing a header of each packet to identify at least one field (e.g., at least one link layer data field, at least one network layer data field, and/or at least one transport layer data field) and/or to extract the respective data from each of the field(s) (e.g., identified field(s)).

In some non-limiting embodiments or aspects, the packet capture system may include at least one first server. Additionally or alternatively, each first server of the plurality of first servers may include at least one of a packet capture subsystem, a lower layer parser subsystem, a protocol identifier subsystem, any combination thereof, and/or the like. For example, each first server may include a lower layer parser subsystem. In some non-limiting embodiments or aspects, parsing the lower layer data from each packet may include parsing, by the lower layer parser subsystem, the lower layer data (e.g., at least one of the data link layer data, the network layer data, the transport layer data, any combination thereof, and/or the like) from each packet of the plurality of packets. In some non-limiting embodiments, the packet capture subsystem may communicate each packet to the lower layer parser subsystem (e.g., before the lower layer parser subsystem parses the packet).

As shown in FIG. 3, at step 306, process 300 may include forwarding at least a portion of each packet to a first queue. For example, the packet capture system may communicate at least a portion (e.g., a respective payload, at least a portion of a respective header, any combination thereof, and/or the like) of each respective packet to at least one first queue. In some non-limiting embodiments or aspects, the packet capture system may determine the respective protocol (e.g., application layer protocol) of each respective packet and/or communicate the respective packet and/or portion (e.g., payload) thereof with protocol data associated with the respective protocol of the respective packet to the first queue. For example, determining a respective protocol of each packet may include analyzing (e.g., by the packet capture system and/or a protocol identifier subsystem thereof) each respective packet (e.g., at least a portion of a respective payload, at least a portion of a respective header, any combination thereof, and/or the like) to identify a protocol (e.g., application layer protocol and/or the like) of the respective packet. For the purpose of illustration, exemplary application layer protocols may include Hypertext Transfer Protocol (HTTP), Hypertext Transfer Protocol Secure (HTTPS), Simple Mail Transfer Protocol (SMTP), Domain Name System (DNS), Server Message Block (SMB), Internet Message Access Protocol (IMAP), Post Office Protocol (POP), Real-time Transport Protocol (RTP), and/or the like.

In some non-limiting embodiments or aspects, the packet capture system may include at least one first server. Additionally or alternatively, each first server of the plurality of first servers may include at least one of a packet capture subsystem, a lower layer parser subsystem, a protocol identifier subsystem, any combination thereof, and/or the like. For example, each first server may include a protocol identifier subsystem. In some non-limiting embodiments or aspects, communicating each respective packet and/or portion (e.g., payload) thereof to the first queue may include determining, by the protocol identifier subsystem, the respective protocol (e.g., application layer protocol) of each respective packet and/or communicating, by the packet capture system, the respective packet and/or portion (e.g., payload) thereof with protocol data associated with the respective protocol of the respective packet to the first queue. In some non-limiting embodiments, the packet capture subsystem and/or the lower layer parser subsystem may communicate each packet to the protocol identifier subsystem (e.g., before the protocol identifier subsystem communicates the packet and/or portion thereof).

In some non-limiting embodiments or aspects, the packet capture system (e.g., the protocol identifier subsystem thereof) may generate a respective packet identifier for each respective packet of the plurality of packets. Additionally or alternatively, communicating the respective packet and/or portion (e.g., payload) thereof to the first queue may include communicating the respective packet and/or portion (e.g., payload) thereof with the respective packet identifier of the respective packet. In some non-limiting embodiments or aspects, each respective packet identifier may be generated (e.g., by packet capture system and/or the protocol identifier subsystem thereof) based on the timestamp, the source IP address (e.g., src_ip), the destination IP address (e.g., dst_ip), the source port (e.g., src_port), the destination port (e.g., dst_port), any combination thereof, and/or the like of the respective packet. For example, a flow hash may be generated (e.g., by packet capture system and/or the protocol identifier subsystem thereof) based on a hash of the source IP address (e.g., src_ip), the destination IP address (e.g., dst_ip), the source port (e.g., src_port), and the destination port (e.g., dst_port) of each packet. As such, multiple packets in a same flow of packets may include a same flow hash. Additionally or alternatively, the timestamp of each packet may uniquely identify the respective packet with respect to other packets in the same flow. In some non-limiting embodiments, the packet identifier may include at least one of (e.g., both of) the flow hash and/or the time stamp.

In some non-limiting embodiments, the protocol identifier subsystem may store the payload of each packet in the first queue as part of a tuple (e.g., a four-tuple of protocol, flow_hash, payload_size, and payload, and/or the like). In some non-limiting embodiments or aspects, the payloads may include binary data. For example, unlike strings/texts, such binary data may not be NULL terminated. Additionally or alternatively, in the first queue, each payload may be stored in consecutive memory. As such, the routing system may use the payload size (e.g., payload_size) of the respective payload to copy the respective payload from the memory until reaching the end of the payload (as indicated by the payload size) for routing to the respective second queue based on the protocol field of the tuple.

In some non-limiting embodiments, the protocol identifier subsystem may identify the protocol type of an application payload using a first packet of a flow (e.g., first packet of a session). For example, communications between two parties may be fragmented and sent in multiple packets over a communication network, and/or the first packet of a session (e.g., an established connection between two peers) may have data associated with the application layer protocol. As such, to determine the protocol of the packets of the session, the protocol identifier subsystem may generate a flow hash, as described herein. Additionally or alternatively, the protocol identifier subsystem may maintain a mapping of the flow-hash and the respective protocol associated therewith. As such, flow hash of packets of a session should remain identical, and/or the protocol identifier subsystem may determine the application layer protocol of the fragmented payloads of a session based on the flow hash.

In some non-limiting embodiments or aspects, the routing system may subscribe to topics of the first queue. For example, each respective topic may be associated with a respective protocol of a plurality of protocols (e.g., possible protocols, supported protocols, and/or the like). In some non-limiting embodiments or aspects, the plurality of protocols may include all protocols (e.g., application layer protocols) associated with at least one of the protocol parser nodes of the parsing system, as described herein. In some non-limiting embodiments or aspects, communicating each respective packet and/or portion (e.g., payload) thereof to the first queue may include publishing, in the first queue (e.g., by the packet capture system and/or the protocol identifier subsystem thereof), each respective packet and/or portion (e.g., payload) thereof with the respective topic based on the respective protocol of the respective packet.

As shown in FIG. 3, at step 308, process 300 may include routing each packet to a respective second queue based on a respective protocol of the packet. For example, the routing system may route each respective packet and/or portion (e.g., payload) thereof to a respective second queue of a plurality of second queues based on a respective protocol (e.g., application layer protocol) of the respective packet.

In some non-limiting embodiments or aspects, the routing system may include at least one second server.

In some non-limiting embodiments or aspects, each respective protocol parser node of the parsing system may be associated with a respective protocol (e.g., respective application layer protocol) of the plurality of protocols. Additionally or alternatively, each respective second queue of the plurality of second queues may be associated with one respective protocol parser node of the parsing system.

In some non-limiting embodiments or aspects, routing each respective packet and/or portion (e.g., payload) thereof to the respective second queue may include routing each respective packet and/or portion (e.g., payload) thereof to a selected one of the plurality of second queues based on the protocol data (e.g., topic) of the respective packet corresponding to the respective protocol of the one respective protocol parser node associated with the selected second queue.

In some non-limiting embodiments or aspects, the routing system may subscribe to topics of the first queue, as described herein. Additionally or alternatively, routing each respective packet and/or portion (e.g., payload) thereof may include the routing system consuming each respective packet and/or portion (e.g., payload) thereof from the first queue.

In some non-limiting embodiments or aspects, routing each respective packet and/or portion (e.g., payload) thereof may include publishing, in the respective second queue (e.g., by the routing system), each respective packet and/or portion (e.g., payload) thereof based on the respective topic (e.g., protocol) of the respective packet. Additionally or alternatively, each protocol parser node of the parsing system may subscribe to at least one (e.g., a respective one) of the second queues.

In some non-limiting embodiments or aspects, the routing system may subscribe to multiple topics (e.g., protocols) in the first queue. For example, the routing system may retrieve a payload tuple (e.g., four-tuple of protocol, flow_hash, payload_size, and payload) from the first queue and/or route the payload to a respective second queue based on the protocol field of the tuple. Additionally or alternatively, the routing system may store a flow in a respective second queue as a tuple (e.g., a three-tuple of flow_hash, payload_size, payload). In some non-limiting embodiments or aspects, the payloads may include binary data. For example, unlike strings/texts, such binary data may not be NULL terminated. Additionally or alternatively, in the respective second queue, each payload may be stored in consecutive memory. As such, the parsing system (e.g., the respective protocol parser node) may use the payload size (e.g., payload_size) of the respective payload to copy the respective payload from the memory until reaching the end of the payload (as indicated by the payload size) for processing by the respective protocol parser node.

As shown in FIG. 3, at step 310, process 300 may include parsing higher layer data (e.g., session layer data, presentation layer data, and/or application layer data). For example, a respective protocol parser node of the parsing system may parse at least one of session layer data, presentation layer data, application layer data, any combination thereof, and/or the like from each respective packet and/or portion (e.g., payload) thereof from the respective second queue.

In some non-limiting embodiments or aspects, the parsing system may include a plurality of third servers. Additionally or alternatively, each respective protocol parser node may include a respective third server and/or a partition thereof.

In some non-limiting embodiments or aspects, the routing system may publish each respective packet and/or portion (e.g., payload) thereof in the respective second queue, as described herein. Additionally or alternatively, parsing the higher layer data (e.g., session layer data, presentation layer data, application layer data, and/or the like) from each respective packet and/or portion (e.g., payload) thereof may include consuming, by the respective protocol parser node of the parsing system, each respective packet and/or portion (e.g., payload) thereof from the respective second queue of the plurality of second queues.

In some non-limiting embodiments or aspects, all packets of a respective flow of packets (e.g., identified based on flow hash and/or the like) may be routed to the same second queue and/or the same protocol parser node. This may ensure that all payloads of the packets in the respective flow are parsed by the same protocol parser node and/or prevent multiple different protocol parser nodes from parsing packets from the same flow (e.g., prevents redundancy, enables one protocol parser node to identify patterns based on all payloads of the packets in the respective flow rather than incomplete information based on only a subset of payloads of the packets in the respective flow, and/or the like).

In some non-limiting embodiments, all packets of a respective flow of packets (e.g., identified based on flow hash and/or the like) may be routed to each of a plurality of protocol parser nodes (e.g., via respective second queues associated with the respective protocol parser nodes). For example, the protocol parser nodes may include at least one protocol parser node for a first protocol from each of a plurality of vendors. Additionally or alternatively, all packets of a first flow of packets of the first protocol may be routed to at least one protocol parser node for the first protocol from each vendor. For the purpose of illustration, if there is a first protocol parser node for the first protocol from a first vendor and a second protocol parser node for the first protocol from a second vendor, all packets of a respective flow of packets may be routed to each of the first protocol parser node and the second protocol parser node.

As shown in FIG. 3, at step 312, process 300 may include communicating parsed data to a third queue. For example, the packet capture system may communicate the lower layer data (e.g., data link layer data, network layer data, transport layer data, and/or the like) for each packet to a third queue. Additionally or alternatively, the parsing system (e.g., the protocol parser nodes thereof) may communicate the higher layer data (e.g., session layer data, presentation layer data, application layer data, and/or the like) for each packet to the third queue.

In some non-limiting embodiments or aspects, communicating the lower layer data for each packet to the third queue may include communicating the lower layer data for each packet with the respective packet identifier thereof to the third queue. Additionally or alternatively, communicating the higher layer data for each packet to the third queue may include communicating the higher layer data for each packet with the respective packet identifier thereof to the third queue.

As shown in FIG. 3, at step 314, process 300 may include aggregating and/or storing parsed data. For example, an aggregation system may aggregate the lower layer data (e.g., data link layer data, network layer data, transport layer data, and/or the like) for each packet with the higher layer data (e.g., session layer data, presentation layer data, application layer data, and/or the like) for each packet. Additionally or alternatively, the aggregation system may store, in the database, the aggregated data (e.g., lower layer data aggregated with the higher layer data) for each packet.

In some non-limiting embodiments or aspects, the aggregation system may include at least one fourth server.

In some non-limiting embodiments or aspects, aggregating the lower layer data with the higher layer data for each packet may include aggregating the lower layer data with the higher layer data based on the respective packet identifier of the respective packet communicated with the lower layer data matching the respective packet identifier of the respective packet communicated with the higher layer data.

In some non-limiting embodiments or aspects, a mapping database may receive (e.g., from a user and/or a computing device of the user) and/or store custom field data associated with a plurality of custom fields (e.g., fields of parsed data from at least one of the parser nodes of the parsing system, which may have custom (e.g., unique, vendor-specific, and/or the like) formatting). Additionally or alternatively, the mapping database may generate a respective mapping between each respective custom field of the plurality of custom fields and a respective common field of a plurality of common fields (e.g., fields selected by at least one entity associated with the aggregation system, which may have common (e.g., selected, preferred, standardized, universal, and/or the like) formatting). In some non-limiting embodiments or aspects, the aggregation system may translate at least some of (e.g., at least one custom field of) the lower layer data and/or the higher layer data (e.g., at least one of the data link layer data, the network layer data, the transport layer data, the session layer data, the presentation layer data, the application layer data, any combination thereof, and/or the like) for at least one packet (e.g., a first packet) based on the respective mapping of the respective custom field(s) to the respective common field(s).

In some non-limiting embodiments or aspects, a policy database may receive (e.g., from a user and/or a computing device of the user) and/or store aggregation policy data associated with at least one aggregation policy. For example, the aggregation policy may include a policy (e.g., a rule, a script, and/or the like) to at least one of filter (e.g., remove) at least one field from the data (e.g., lower layer data, higher layer data, and/or the like), add at least one field to the data (e.g., generate and/or append at least one field to the data), combine at least two fields of the data, any combination thereof, and the like. In some non-limiting embodiments or aspects, the aggregation system may filter at least one field of at least one packet (e.g., a first packet) and/or the data (e.g., higher layer data, lower layer data, and/or the like) associated therewith based on the aggregation policy (or policies). Additionally or alternatively, the aggregation system may add (e.g., generate and/or append) at least one field to the data associated with at least one packet (e.g., the first packet, a second packet, and/or the like) based on the aggregation policy (or policies). Additionally or alternatively, the aggregation system may combine at least two fields of at least one packet (e.g., the first packet, the second packet, a third packet, and/or the like) and/or the data associated therewith based on the aggregation policy (or policies).

In some non-limiting embodiments or aspects, after the data is aggregated, the data may be stored in the database based on the aggregation policy defined in the policy database. Additionally or alternatively, the aggregated data may be used (e.g., accessed, read, analyzed, and/or the like) by an intrusion detection and/or prevention system. For example, an intrusion detection and/or prevention system determine whether there is at least one anomaly based on the aggregated data stored in the database. In response to determining there is such an anomaly, the intrusion detection and/or prevention system may generate at least one alert based on at least one security policy in the policy database. In some non-limiting embodiments or aspects, the intrusion detection and/or prevention system may retrieve the aggregated data from the database and/or receive the data directly from the aggregation system (e.g., the aggregation system may communicate a copy of the aggregated data to the intrusion detection and/or prevention system and another copy of the aggregated data to the database). In some non-limiting embodiments or aspects, the aggregated data may be retrieved from the database (e.g., in response to input from a user) for investigation of a network attack (e.g., by the user).

In some non-limiting embodiments or aspects, a resource monitoring system may monitor at least one of the packet capture system, the routing system, the parsing system, the aggregation system, the first queue, the second queues, the third queue, any combination thereof, and/or the like to provide respective metrics (e.g., resource utilization (e.g., processor utilization, memory utilization, input/output (I/O) utilization, any combination thereof, and/or the like), data rate, packet drop rate, rate of enqueue (e.g., enqueue operations), rate of dequeue (e.g., dequeue operations), queue utilization, any combination thereof, and/or the like) for each of the aforementioned systems and/or queues. Additionally or alternatively, a node provisioning system may determine whether to add a node (e.g., a server and/or a partition thereof) to and/or remove a node from at least one of the packet capture system, the routing system, the parsing system, and/or the aggregation system based on at least one of the respective metrics.

In some non-limiting embodiments or aspects, the resource monitoring system may include a packet capture system monitoring agent. Additionally or alternatively, the node provisioning system may include a packet capture system node provisioning system. In some non-limiting embodiments or aspects, the packet capture system monitoring agent may determine whether to add a node (e.g., an additional first server or an additional partition thereof) to the packet capture system based on the metrics of the packet capture system. For example, if resource utilization (e.g., at least one of processor utilization, memory utilization, input/output (I/O) utilization, any combination thereof, and/or the like) is too high (e.g., satisfies (e.g., exceeds) at least one first threshold), data rate (e.g., packet rate) is too high (e.g., satisfies (e.g., exceeds) a second threshold), and/or packet drop rate is too high (e.g., satisfies (e.g., exceeds) a third threshold), the packet capture system monitoring agent may determine to add a node to the packet capture system. Additionally or alternatively, if resource utilization (e.g., at least one of processor utilization, memory utilization, input/output (I/O) utilization, any combination thereof, and/or the like) is too low (e.g., satisfies (e.g., is less than) at least one fourth threshold), data rate (e.g., packet rate) is too low (e.g., satisfies (e.g., is less than) a fifth threshold), and/or packet drop rate is too low (e.g., satisfies (e.g., is less than) a sixth threshold and/or is zero), the packet capture system monitoring agent may determine to remove a node from the packet capture system. In some non-limiting embodiments or aspects, the packet capture system node provisioning system may add (e.g., provision, upscale, and/or the like) a node to or remove (e.g., downscale) a node from the packet capture system based on the packet capture system monitoring agent determining whether to add or remove a node, respectively.

In some non-limiting embodiments or aspects, the resource monitoring system may include a first queue monitoring agent and/or a routing system monitoring agent. Additionally or alternatively, the node provisioning system may include a routing system node provisioning system. In some non-limiting embodiments or aspects, the first queue monitoring agent and/or routing system monitoring agent may determine whether to add a node (e.g., an additional second server or an additional partition thereof) to the routing system based on the metrics of the first queue and/or the routing system. For example, if resource utilization (e.g., at least one of processor utilization, memory utilization, input/output (I/O) utilization, any combination thereof, and/or the like) of the routing system is too high (e.g., satisfies (e.g., exceeds) at least one first threshold), data rate (e.g., packet rate) of the routing system is too high (e.g., satisfies (e.g., exceeds) a second threshold), and/or packet drop rate of the routing system is too high (e.g., satisfies (e.g., exceeds) a third threshold), the routing system monitoring agent may determine to add a node to the routing system. Additionally or alternatively, if the rate of enqueue of the first queue is too high (e.g., satisfies (e.g., exceeds) a fourth threshold), rate of dequeue of the first queue is too low (e.g., is less than the rate of enqueue of the first queue, satisfies (e.g., is less than) at least one fifth threshold, and/or the like), and/or queue utilization is too high (e.g., satisfies (e.g., exceeds) a sixth threshold), the first queue monitoring agent may determine to add a node to the routing system. Additionally or alternatively, if resource utilization (e.g., at least one of processor utilization, memory utilization, input/output (I/O) utilization, any combination thereof, and/or the like) of the routing system is too low (e.g., satisfies (e.g., is less than) at least one seventh threshold), data rate (e.g., packet rate) of the routing system is too low (e.g., satisfies (e.g., is less than) an eighth threshold), and/or packet drop rate of the routing system is too low (e.g., satisfies (e.g., is less than) a ninth threshold or is zero), the routing system monitoring agent may determine to remove a node from the routing system. Additionally or alternatively, if the rate of enqueue of the first queue is too low (e.g., satisfies (e.g., is less than) a tenth threshold), rate of dequeue of the first queue is too high (e.g., is greater than the rate of enqueue of the first queue, satisfies (e.g., exceeds) at least one eleventh threshold, and/or the like), and/or queue utilization is too low (e.g., satisfies (e.g., is less than) a twelfth threshold), the first queue monitoring agent may determine to remove a node from the routing system. In some non-limiting embodiments or aspects, the routing system node provisioning system may add (e.g., provision, upscale, and/or the like) a node to or remove (e.g., downscale) a node from the routing system based on the routing system monitoring agent and/or the first queue monitoring agent determining whether to add or remove a node, respectively.

In some non-limiting embodiments or aspects, the resource monitoring system may include a second queue monitoring agent and/or a parsing system monitoring agent. Additionally or alternatively, the node provisioning system may include a parsing system node provisioning system. In some non-limiting embodiments or aspects, the second queue monitoring agent and/or parsing system monitoring agent may determine whether to add a node (e.g., an additional third server or an additional partition thereof) to the parsing system based on the metrics of the second queues and/or the parsing system. For example, if resource utilization (e.g., at least one of processor utilization, memory utilization, input/output (I/O) utilization, any combination thereof, and/or the like) of the parsing system and/or any protocol parser node thereof is too high (e.g., satisfies (e.g., exceeds) at least one first threshold), data rate (e.g., packet rate) of the parsing system and/or any protocol parser node thereof is too high (e.g., satisfies (e.g., exceeds) a second threshold), and/or packet drop rate of the parsing system and/or any protocol parser node thereof is too high (e.g., satisfies (e.g., exceeds) a third threshold), the parsing system monitoring agent may determine to add a node to the parsing system. Additionally or alternatively, if the rate of enqueue of at least one (e.g., at least some) of the second queues is too high (e.g., satisfies (e.g., exceeds) a fourth threshold), rate of dequeue of at least one (e.g., at least some) of the second queues is too low (e.g., is less than the rate of enqueue of the respective second queue, satisfies (e.g., is less than) at least one fifth threshold, and/or the like), and/or queue utilization of at least one (e.g., at least some) of the second queues is too high (e.g., satisfies (e.g., exceeds) a sixth threshold), the second queue monitoring agent may determine to add a node to the parsing system. Additionally or alternatively, if resource utilization (e.g., at least one of processor utilization, memory utilization, input/output (I/O) utilization, any combination thereof, and/or the like) of the parsing system and/or any protocol parser node thereof is too low (e.g., satisfies (e.g., is less than) at least one seventh threshold), data rate (e.g., packet rate) of the parsing system and/or any protocol parser node thereof is too low (e.g., satisfies (e.g., is less than) an eighth threshold), and/or packet drop rate of the parsing system and/or any protocol parser node thereof is too low (e.g., satisfies (e.g., is less than) a ninth threshold or is zero), the parsing system monitoring agent may determine to remove a node from the parsing system. Additionally or alternatively, if the rate of enqueue of at least one (e.g., at least some) of the second queues is too low (e.g., satisfies (e.g., is less than) a tenth threshold), rate of dequeue of at least one (e.g., at least some) of the second queues is too high (e.g., is greater than the rate of enqueue of the respective second queue, satisfies (e.g., exceeds) at least one eleventh threshold, and/or the like), and/or queue utilization of at least one (e.g., at least some) of the second queues is too low (e.g., satisfies (e.g., is less than) a twelfth threshold), the second queue monitoring agent may determine to remove a node from the parsing system. In some non-limiting embodiments or aspects, the parsing system node provisioning system may add (e.g., provision, upscale, and/or the like) a node to or remove (e.g., downscale) a node from the parsing system based on the parsing system monitoring agent and/or the second queue monitoring agent determining whether to add or remove a node, respectively.

In some non-limiting embodiments or aspects, the resource monitoring system may include a third queue monitoring agent and/or an aggregation system monitoring agent. Additionally or alternatively, the node provisioning system may include an aggregation system node provisioning system. In some non-limiting embodiments or aspects, the third queue monitoring agent and/or aggregation system monitoring agent may determine whether to add a node (e.g., an additional fourth server or an additional partition thereof) to the aggregation system based on the metrics of the third queue and/or the routing system. For example, if resource utilization (e.g., at least one of processor utilization, memory utilization, input/output (I/O) utilization, any combination thereof, and/or the like) of the aggregation system is too high (e.g., satisfies (e.g., exceeds) at least one first threshold), data rate (e.g., packet rate) of the aggregation system is too high (e.g., satisfies (e.g., exceeds) a second threshold), and/or packet drop rate of the routing system is too high (e.g., satisfies (e.g., exceeds) a third threshold), the aggregation system monitoring agent may determine to add a node to the aggregation system. Additionally or alternatively, if the rate of enqueue of the third queue is too high (e.g., satisfies (e.g., exceeds) a fourth threshold), rate of dequeue of the first queue is too low (e.g., is less than the rate of enqueue of the first queue, satisfies (e.g., is less than) at least one fifth threshold, and/or the like), and/or queue utilization is too high (e.g., satisfies (e.g., exceeds) a sixth threshold), the third queue monitoring agent may determine to add a node to the aggregation system. Additionally or alternatively, if resource utilization (e.g., at least one of processor utilization, memory utilization, input/output (I/O) utilization, any combination thereof, and/or the like) of the aggregation system is too low (e.g., satisfies (e.g., is less than) at least one seventh threshold), data rate (e.g., packet rate) of the aggregation system is too low (e.g., satisfies (e.g., is less than) an eighth threshold), and/or packet drop rate of the aggregation system is too low (e.g., satisfies (e.g., is less than) a ninth threshold or is zero), the aggregation system monitoring agent may determine to remove a node from the aggregation system. Additionally or alternatively, if the rate of enqueue of the third queue is too low (e.g., satisfies (e.g., is less than) a tenth threshold), rate of dequeue of the third queue is too high (e.g., is greater than the rate of enqueue of the third queue, satisfies (e.g., exceeds) at least one eleventh threshold, and/or the like), and/or queue utilization is too low (e.g., satisfies (e.g., is less than) a twelfth threshold), the third queue monitoring agent may determine to remove a node from the aggregation system. In some non-limiting embodiments or aspects, the aggregation system node provisioning system may add (e.g., provision, upscale, and/or the like) a node to or remove (e.g., downscale) a node from the aggregation system based on aggregation system monitoring agent and/or the third queue monitoring agent determining whether to add or remove a node, respectively.

Figure 4A:
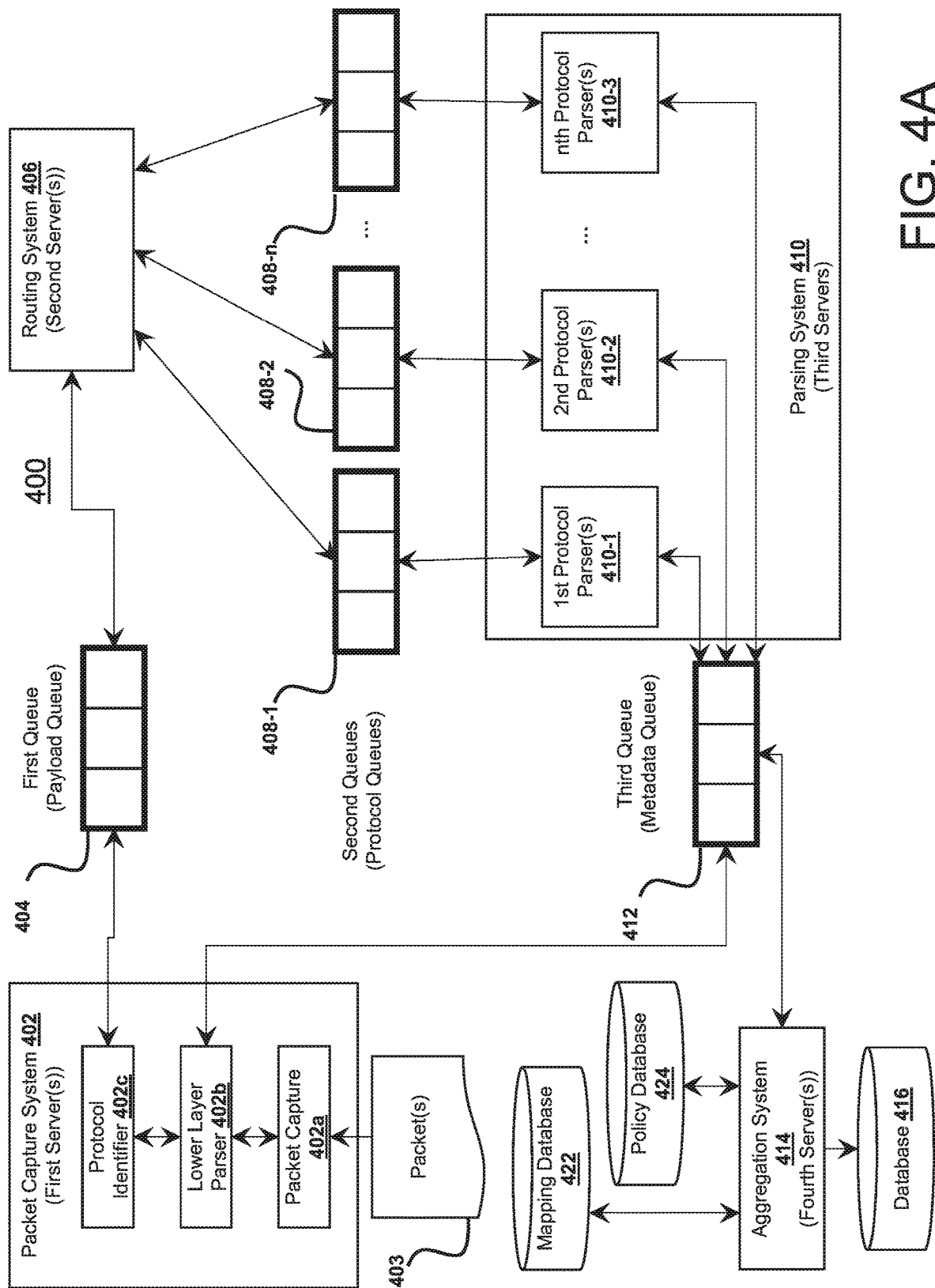
Figure 4B:
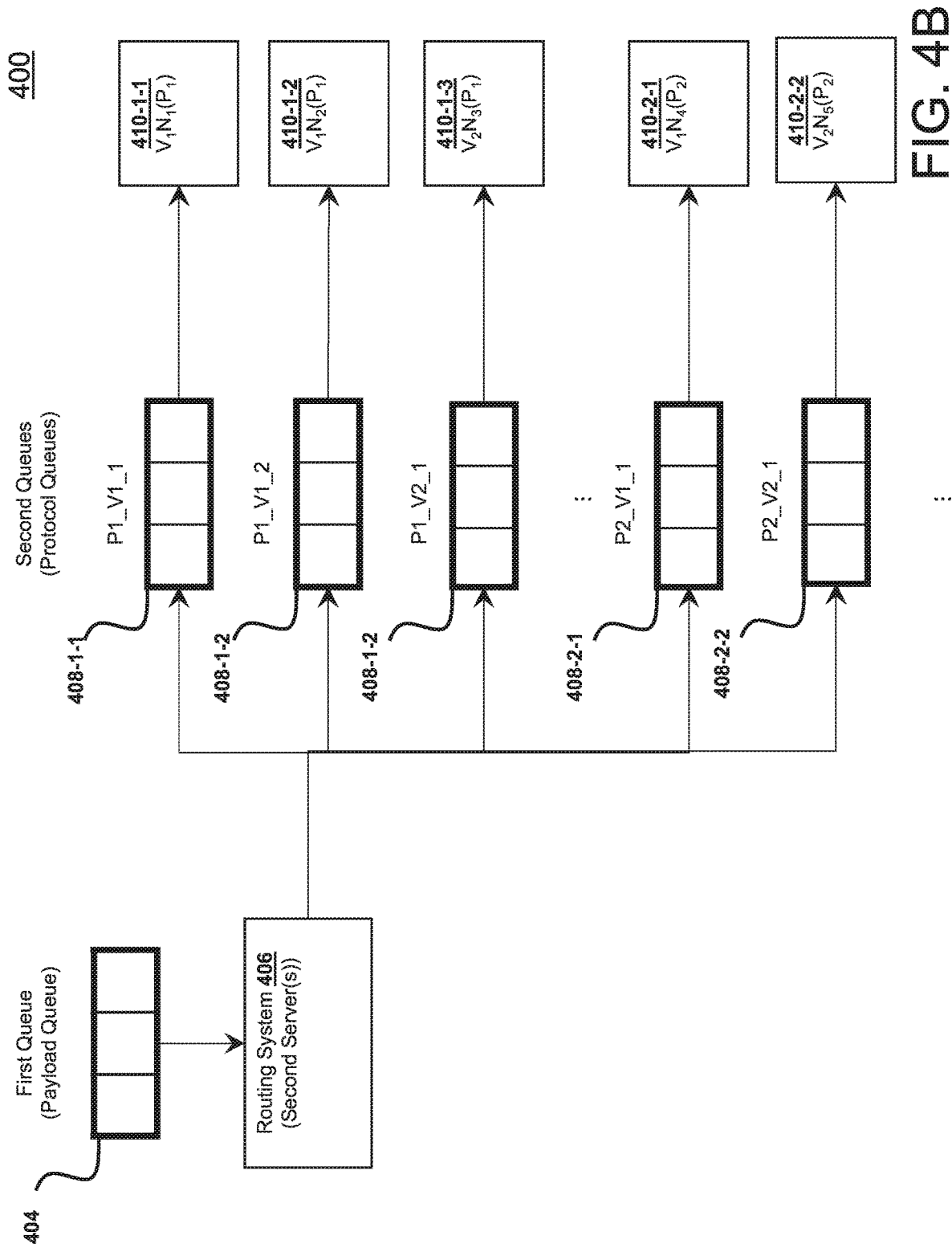

Referring now to FIGS. 4A-4C, FIGS. 4A-4C are diagrams of an exemplary implementation 400 of a non-limiting embodiment or aspect relating to process 300 shown in FIG. 3. As shown in FIGS. 4A-4C, implementation 400 may include at least one packet 403, packet capture system 402, packet capture subsystem 402a, lower layer parser subsystem 402b, protocol identifier subsystem 402c, first queue 404, routing system 406, at least one second queue (e.g., at least one first protocol queue 408-1, at least one second queue 408-2, . . . , at least one nth protocol queue 408-n, collectively referred to as second queues 408 and individually referred to as second queue 408), parsing system 410, at least one protocol parser node (e.g., at least one first protocol parser node 410-1, at least one second protocol parser node 410-2, . . . , at least one nth protocol parser node 410-n), third queue 412, aggregation system 414, database 416, resource monitoring system 418, node provisioning system 420, mapping database 422, policy database 424, any combination thereof, and/or the like. In some non-limiting embodiments or aspects, the components of implementation 400 may be the same as, similar to, and/or part of transaction service provider system 102 (e.g., one or more devices of transaction service provider system 102). In some non-limiting embodiments or aspects, the components of implementation 400 may be the same as, similar to, and/or part of another system, another device, another group of systems, or another group of devices, separate from or including transaction service provider system 102, such as issuer system 104, customer device 106, merchant system 108, acquirer system 110, and/or the like.

In some non-limiting embodiments or aspects, packet capture system 402 may include and/or be part of at least one computing device. For example, packet capture system 402 may include and/or be part of at least one server (e.g., first server(s)) or at least one partition thereof. Additionally or alternatively, packet capture system 402 may be the same as or similar to the packet capture system described above with reference to FIG. 3.

In some non-limiting embodiments or aspects, packet capture system 402 may include at least one subsystem. For example, packet capture system 402 may include packet capture subsystem 402a, lower layer parser subsystem 402b, protocol identifier subsystem 402c, any combination thereof, and/or the like. In some non-limiting embodiments or aspects, each subsystem (e.g., packet capture subsystem 402a, lower layer parser subsystem 402b, protocol identifier subsystem 402c, and/or the like) may be implemented (e.g., completely, partially, and/or the like) by at least one server and/or a partition thereof. For example, packet capture system 402 may include a plurality of first server(s), and each first server may include an instance of each of packet capture subsystem 402a, lower layer parser subsystem 402b, and protocol identifier subsystem 402c. Additionally or alternatively, the plurality of first servers may operate in parallel.

In some non-limiting embodiments or aspects, first queue 404 may include and/or be part of at least one computing device. For example, first queue 404 may include a message queue (e.g., Kafka and/or the like), a FIFO queue, a priority queue, at least one server or a partition thereof, a database, any combination thereof, and/or the like. Additionally or alternatively, the first queue 404 may be the same as or similar to the first queue described above with reference to FIG. 3.

In some non-limiting embodiments or aspects, routing 406 system may include and/or be part of at least one computing device. For example, routing system 406 may include at least one server (e.g., second server(s)) or a partition thereof. Additionally or alternatively, routing system 406 may be the same as or similar to the routing system described above with reference to FIG. 3. In some non-limiting embodiments or aspects, routing system 406 may include a plurality of second servers, and each second server may include an instance of routing system 404. Additionally or alternatively, the plurality of second servers may operate in parallel.

In some non-limiting embodiments or aspects, each second queue 408 may include and/or be part of at least one computing device. For example, each second queue 408 may include a message queue (e.g., Kafka and/or the like), a FIFO queue, a priority queue, at least one server or a partition thereof, a database, any combination thereof, and/or the like. Additionally or alternatively, each second queue 408 may be the same as or similar to the second queues described above with reference to FIG. 3.

In some non-limiting embodiments or aspects, parsing system 410 may include and/or be part of at least one computing device. For example, parsing system 410 may include at least one server (e.g., third server(s)) or a partition thereof. Additionally or alternatively, parsing system 410 may be the same as or similar to the parsing system described above with reference to FIG. 3.

In some non-limiting embodiments or aspects, parsing system 410 may include at least one protocol parser node (e.g., at least one first protocol parser node 410-1, at least one second protocol parser node 410-2, ..., at least one nth protocol parser node 410-n, any combination thereof, and/or the like). For example, each protocol parser node may be implemented (e.g., completely, partially, and/or the like) by at least one server and/or a partition thereof. In some non-limiting embodiments or aspects, parsing system 410 may include a plurality of third servers, and each third server may include at least one protocol parser node. Additionally or alternatively, the plurality of third servers and/or the plurality of protocol parser nodes may operate in parallel. In some non-limiting embodiments or aspects, each protocol parser node (e.g., at least one first protocol parser node 410-1, at least one second protocol parser node 410-2, ..., at least one nth protocol parser node 410-n, any combination thereof, and/or the like) may be the same as or similar to the protocol parser nodes described above with reference to FIG. 3.

In some non-limiting embodiments or aspects, third queue 412 may include and/or be part of at least one computing device. For example, third queue 412 may include a message queue (e.g., Kafka and/or the like), a FIFO queue, a priority queue, at least one server or a partition thereof, a database, any combination thereof, and/or the like. Additionally or alternatively, third queue 412 may be the same as or similar to the third queue described above with reference to FIG. 3.

In some non-limiting embodiments or aspects, aggregation system 414 may include and/or be part of at least one computing device. For example, aggregation system 414 may include at least one server (e.g., fourth server(s)) or a partition thereof. Additionally or alternatively, aggregation system 414 may be the same as or similar to the aggregation system described above with reference to FIG. 3.

In some non-limiting embodiments or aspects, database 416 may include and/or be part of at least one computing device. For example, database 416 may include a database (e.g., an SQL database, a non-SQL database, a relational database, a non-relational database, a distributed database, and/or the like), at least one server or a partition thereof, any combination thereof, and/or the like. Additionally or alternatively, database 416 may be the same as or similar to the database described above with reference to FIG. 3.

In some non-limiting embodiments or aspects, resource monitoring system 418 may include and/or be part of at least one computing device. For example, resource monitoring system 418 may include at least one server (e.g., fifth server(s)) or a partition thereof. Additionally or alternatively, resource monitoring system 418 may be the same as or similar to the resource monitoring system described above with reference to FIG. 3.

In some non-limiting embodiments or aspects, node provisioning system 420 may include and/or be part of at least one computing device. For example, node provisioning system 420 may include at least one server (e.g., sixth server(s)) or a partition thereof. Additionally or alternatively, node provisioning system 420 may be the same as or similar to the node provisioning system described above with reference to FIG. 3.

In some non-limiting embodiments or aspects, mapping database 422 may include and/or be part of at least one computing device. For example, mapping database 422 may include a database (e.g., an SQL database, a non-SQL database, a relational database, a non-relational database, a distributed database, and/or the like), at least one server or a partition thereof, any combination thereof, and/or the like. Additionally or alternatively, mapping database 422 may be the same as or similar to the mapping database described above with reference to FIG. 3.

In some non-limiting embodiments or aspects, policy database 424 may include and/or be part of at least one computing device. For example, policy database 424 may include a database (e.g., an SQL database, a non-SQL database, a relational database, a non-relational database, a distributed database, and/or the like), at least one server or a partition thereof, any combination thereof, and/or the like. Additionally or alternatively, policy database 424 may be the same as or similar to the policy database described above with reference to FIG. 3.

With reference to FIG. 4A, in some non-limiting embodiments or aspects, packet capture system 402 may receive a plurality of packets (e.g., from a communication network, such as communication network 112 and/or the like, and/or a network tap connected thereto), as described herein. For example, packet capture subsystem 402a may receive the packets, as described herein.

In some non-limiting embodiments or aspects, packet capture system 402 may parse lower layer data (e.g., at least one of data link layer data, network layer data, transport layer data, any combination thereof, and/or the like) from each packet, as described herein. For example, lower layer parser subsystem 402b may parse the lower layer data (e.g., at least one of the data link layer data, the network layer data, the transport layer data, any combination thereof, and/or the like) from each packet, as described herein.

In some non-limiting embodiments or aspects, packet capture system 402 may communicate at least a portion (e.g., a respective payload, at least a portion of a respective header, any combination thereof, and/or the like) of each respective packet to at least one first queue 404, as described herein. Additionally or alternatively, packet capture system 402 may determine the respective protocol (e.g., application layer protocol) of each respective packet and/or communicating the respective packet and/or portion (e.g., payload) thereof with protocol data associated with the respective protocol of the respective packet to first queue 404. For example, protocol identifier subsystem 402c may determine the respective protocol (e.g., application layer protocol) of each respective packet and/or communicate the respective packet and/or portion (e.g., payload) thereof with protocol data associated with the respective protocol of the respective packet to first queue 404, as described herein.

In some non-limiting embodiments or aspects, packet capture system 402 (e.g., the protocol identifier subsystem 402c thereof and/or the like) may generate a respective packet identifier for each respective packet, as described herein. Additionally or alternatively, packet capture system 402 (e.g., the protocol identifier subsystem 402c thereof and/or the like) may communicate the respective packet and/or portion (e.g., payload) thereof with the respective packet identifier of the respective packet.

In some non-limiting embodiments or aspects, routing system 406 may subscribe to topics of first queue 404, as described herein. For example, each respective topic may be associated with a respective protocol of a plurality of protocols, as described herein. In some non-limiting embodiments or aspects, packet capture system 402 (e.g., the protocol identifier subsystem 402c thereof and/or the like) may publish, in the first queue, each respective packet and/or portion (e.g., payload) thereof with the respective topic based on the respective protocol of the respective packet.

In some non-limiting embodiments or aspects, routing system 406 may route each respective packet and/or portion (e.g., payload) thereof to a respective second queue of a plurality of second queues based on a respective protocol (e.g., application layer protocol) of the respective packet, as described herein.

In some non-limiting embodiments or aspects, each respective protocol parser node (e.g., at least one first protocol parser node 410-1, at least one second protocol parser node 410-2, . . . , at least one nth protocol parser node 410-n) of parsing system 410 may be associated with a respective protocol (e.g., respective application layer protocol) of the plurality of protocols, as described herein. Additionally or alternatively, each respective second queue 408 may be associated with one respective protocol parser node of parsing system 410, as described herein.

In some non-limiting embodiments or aspects, routing system 406 may route each respective packet and/or portion (e.g., payload) thereof to a selected one of the second queues 408 based on the protocol data (e.g., topic) of the respective packet corresponding to the respective protocol of the one respective protocol parser node (e.g., a respective one of first protocol parser node 410-1, second protocol parser node 410-2, . . . , nth protocol parser node 410-n) associated with the selected second queue 408.

With reference to FIG. 4B, in some non-limiting embodiments or aspects, there may be multiple protocol parser nodes associated with each respective protocol of the plurality of (application layer) protocols. For example, each first protocol parser node 410-1 of a plurality of first protocol parser nodes 410-1 (e.g., first-first protocol parser node 410-1-1, second-first protocol parser node 410-1-2, third-first protocol parser node 410-1-3, etc.) may be associated with a first application layer protocol $P_1$. Additionally or alternatively, each second protocol parser node 410-2 of a plurality of second protocol parser nodes 410-2 (e.g., first-second protocol parser node 410-2-1, second-first protocol parser node 410-1-2, etc.) may be associated with a second application layer protocol $P_2$. In some non-limiting embodiments or aspects, each protocol parser node may have a respective second queue 408 associated therewith (e.g., each protocol parser node may subscribe to and/or consume packets (and/or portions thereof) from a respective one of second queues 408 and/or the like). For example, first-first protocol parser node 410-1-1 may have first-first protocol second queue 408-1-1 associated therewith; second-first protocol parser node 410-1-2 may have second-first protocol second queue 408-1-2 associated therewith; third-first protocol parser node 410-1-3 may have third-first protocol second queue 408-1-3 associated therewith; first-second protocol parser node 410-2-1 may have first-second protocol second queue 408-2-1 associated therewith; second-first protocol parser node 410-1-2 may have second-second protocol second queue 408-2-2 associated therewith; any combination thereof; and/or the like. In some non-limiting embodiments or aspects, at least some of the protocol parser nodes may be from different vendors. For example, first-first protocol parser node 410-1-1, second-first protocol parser node 410-1-2, and/or first-second protocol parser node 410-2-1 may be from a first vendor $V_1$; third-first protocol parser node 410-1-3 and/or second-second protocol parser node 410-2-2 may be from a second vendor $V_2$; any combination thereof; and/or the like. As such, first-first protocol parser node 410-1-1 may include a first node $N_1$ associated with the first vendor $V_1$ for the first protocol $P_1$, and/or second-first protocol parser node 410-1-2 may include a second node $N_2$ associated with the first vendor $V_1$ for the first protocol $P_1$. Additionally or alternatively, third-first protocol parser node 410-1-3 may include a third node $N_3$ associated with the second vendor $V_2$ for the first protocol $P_1$. Additionally or alternatively, first-second protocol parser node 410-2-1 may include a fourth node $N_4$ associated with the first vendor $V_1$ for the second protocol $P_2$, and/or second-second protocol parser node 410-2-2 may include a fifth node $N_5$ associated with the second vendor $V_2$ for the second protocol $P_2$. In some non-limiting embodiments or aspects, the second queues 408 may include identifiers associated with the protocol, the vendor, and/or the node number of the respective protocol parser node associated therewith. For example, first-first protocol second queue 408-1-1 may have an identifier based on the first protocol $P_1$ and the first vendor $V_1$ (e.g., P1_V1_1); second-first protocol second queue 408-1-2 may have an identifier based on the first protocol $P_1$ and the first vendor $V_1$ (e.g., P1_V1_2); third-first protocol second queue 408-1-3 may have an identifier based on the first protocol $P_1$ and the second vendor $V_2$ (e.g., P1_V2_1); first-second protocol second queue 408-2-1 may have an identifier based on the second protocol $P_2$ and the first vendor $V_1$ (e.g., P2_V1_1); and/or second-second protocol second queue 408-2-2 may have an identifier based on the second protocol $P_2$ and the second vendor $V_2$ (e.g., P2_V2_1).

In some non-limiting embodiments, each protocol parser node of parsing system 410 may have its own second queue 408. Additionally or alternatively, routing system 406 may assign a respective second queue 408 to a respective protocol parser node as protocol_vendor_identifier, as described herein. In some non-limiting embodiments, routing system 406 may maintain (e.g., store) a list of the number of second queues 408 per protocol for each vendor. In some non-limiting embodiments or aspects, each protocol parser node may communicate the vendor (e.g., $V_1$, $V_2$, etc.) and/or the protocol (e.g., $P_1$, $P_2$, etc.) to routing system 406. Additionally or alternatively, routing system 406 may determine a topic for the respective protocol parser node as follows. Routing system 406 may check if the respective vendor is in the list of vendors, and if not, routing system 406 may add the respective vendor to the list of vendors. Additionally or alternatively, routing system 406 may retrieve the total number of second queues 408 of the respective protocol for the respective vendor from the list, and/or routing system 406 may increase that number by one (e.g., representing adding the respective protocol parser node to the list). Additionally or alternatively, routing system 406 may determine (e.g., compute) an identifier of a respective second queue 408 based on the list. Additionally or alternatively, routing system 406 may determine (e.g., generate) a topic as protocol_vendor_identifier (e.g., P1_V1_1, P1_V1_2, P1_V2_1, P2_V1_1, P2_V2_1, and/or the like).

In some non-limiting embodiments, a flow of packets (e.g., packets from a session and/or the like) may be assigned to a respective second queue 408 and/or respective protocol parser node based on the flow hash. For example, routing system 406 may determine flow hash modulo the number of second queues 408 for a given protocol (e.g., flow_hash mod (# of queues)).

With continued reference to FIG. 4A, in some non-limiting embodiments or aspects, routing system 406 may subscribe to topics of first queue 404, as described herein. Additionally or alternatively, routing system 406 may consume each respective packet and/or portion (e.g., payload) thereof from first queue 404, as described herein.

In some non-limiting embodiments or aspects, routing system 406 may publish, in the respective second queue 408, each respective packet and/or portion (e.g., payload) thereof based on the respective topic (e.g., protocol) of the respective packet, as described herein. Additionally or alternatively, each protocol parser node of parsing system 410 may subscribe to at least one (e.g., a respective one) of the second queues 408, as described herein.

In some non-limiting embodiments or aspects, each respective protocol parser node of parsing system 410 may parse higher layer data (e.g., at least one of session layer data, presentation layer data, application layer data, any combination thereof, and/or the like) from each respective packet and/or portion (e.g., payload) thereof from the respective second queue, as described herein.

In some non-limiting embodiments or aspects, routing system 406 may publish each respective packet and/or portion (e.g., payload) thereof in the respective second queue 408, as described herein. Additionally or alternatively, each respective protocol parser node of parsing system 410 may subscribe to and/or consume the respective packets and/or portions (e.g., payloads) thereof from the respective second queue 408, as described herein.

In some non-limiting embodiments or aspects, packet capture system 402 may communicate the lower layer data (e.g., data link layer data, network layer data, transport layer data, and/or the like) for each packet to third queue 412, as described herein. Additionally or alternatively, parsing system 410 (e.g., the protocol parser nodes thereof) may communicate the higher layer data (e.g., session layer data, presentation layer data, application layer data, and/or the like) for each packet to third queue 412, as described herein.

In some non-limiting embodiments or aspects, aggregation system 414 may aggregate the lower layer data (e.g., data link layer data, network layer data, transport layer data, and/or the like) for each packet with the higher layer data (e.g., session layer data, presentation layer data, application layer data, and/or the like) for each packet, as described herein. Additionally or alternatively, aggregation system 414 may store, in database 416, the aggregated data (e.g., lower layer data aggregated with the higher layer data) for each packet, as described herein.

In some non-limiting embodiments or aspects, mapping database 422 may receive (e.g., from a user and/or a computing device of the user) and/or store custom field data associated with a plurality of custom fields (e.g., fields of parsed data from at least one of the parser nodes of the parsing system, which may have custom (e.g., unique, vendor-specific, and/or the like) formatting), as described herein. Additionally or alternatively, mapping database 422 may generate a respective mapping between each respective custom field of the plurality of custom fields and a respective common field of a plurality of common fields (e.g., fields selected by at least one entity associated with the aggregation system, which may have common (e.g., selected, preferred, standardized, universal, and/or the like) formatting), as described herein. In some non-limiting embodiments or aspects, the aggregation system 414 may translate at least some of (e.g., at least one custom field of) the lower layer data and/or the higher layer data (e.g., at least one of the data link layer data, the network layer data, the transport layer data, the session layer data, the presentation layer data, the application layer data, any combination thereof, and/or the like) for at least one packet (e.g., a first packet) based on the respective mapping of the respective custom field(s) to the respective common field(s), as described herein.

In some non-limiting embodiments or aspects, policy database 424 may receive (e.g., from a user and/or a computing device of the user) and/or store aggregation policy data associated with at least one aggregation policy, as described herein. In some non-limiting embodiments or aspects, aggregation system 414 may filter at least one field of at least one packet (e.g., a first packet) and/or the data (e.g., higher layer data, lower layer data, and/or the like) associated therewith based on the aggregation policy (or policies), as described herein. Additionally or alternatively, aggregation system 414 may add (e.g., generate and/or append) at least one field to the data associated with at least one packet (e.g., the first packet, a second packet, and/or the like) based on the aggregation policy (or policies), as described herein. Additionally or alternatively, aggregation system 414 may combine at least two fields of at least one packet (e.g., the first packet, the second packet, a third packet, and/or the like) and/or the data associated therewith based on the aggregation policy (or policies), as described herein.

With reference to FIG. 4C, in some non-limiting embodiments or aspects, resource monitoring system 418 may monitor at least one of packet capture system 402, routing system 406, parsing system 410, aggregation system 414, first queue 404, second queues 408, third queue 412, any combination thereof, and/or the like to provide respective metrics (e.g., resource utilization (e.g., processor utilization, memory utilization, input/output (I/O) utilization, any combination thereof, and/or the like), data rate, packet drop rate, rate of enqueue (e.g., enqueue operations), rate of dequeue (e.g., dequeue operations), queue utilization, any combination thereof, and/or the like) for each of the aforementioned systems and/or queues, as described herein. Additionally or alternatively, node provisioning system 420 may determine whether to add a node (e.g., a server and/or a partition thereof) to and/or remove a node from at least one of packet capture system 402, routing system 406, parsing system 410, and/or aggregation system 414 based on at least one of the respective metrics, as described herein.

In some non-limiting embodiments or aspects, resource monitoring system 418 may include a packet capture system monitoring agent, as described therein. Additionally or alternatively, node provisioning system 420 may include a packet capture system node provisioning system, as described herein. In some non-limiting embodiments or aspects, the packet capture system monitoring agent may determine whether to add a node (e.g., an additional first server or an additional partition thereof) to and/or remove a node from packet capture system 402 based on the metrics of the packet capture system, as described herein.

In some non-limiting embodiments or aspects, resource monitoring system 418 may include a first queue monitoring agent and/or a routing system monitoring agent, as described herein. Additionally or alternatively, node provisioning system 420 may include a routing system node provisioning system, as described herein. In some non-limiting embodiments or aspects, the first queue monitoring agent and/or routing system monitoring agent may determine whether to add a node (e.g., an additional second server or an additional partition thereof) to and/or remove a node from routing system 406 based on the metrics of first queue 404 and/or routing system 406, as described herein.

In some non-limiting embodiments or aspects, resource monitoring system 418 may include a second queue monitoring agent and/or a parsing system monitoring agent, as described herein. Additionally or alternatively, node provisioning system 420 may include a parsing system node provisioning system, as described herein. In some non-limiting embodiments or aspects, second queue monitoring agent and/or parsing system monitoring agent may determine whether to add a node (e.g., an additional third server or an additional partition thereof) to and/or remove a node from parsing system 410 based on the metrics of second queues 408 and/or parsing system 410, as described herein.

Referring now to FIG. 5, FIG. 5 is a swimlane diagram of an exemplary implementation 500 of a non-limiting embodiment or aspect relating to process 300 shown in FIG. 3 and/or implementation 400 shown in FIGS. 4A-4C. In some non-limiting embodiments or aspects, one or more of the steps of implementation 500 may be performed (e.g., completely, partially, and/or the like) by transaction service provider system 102 (e.g., one or more devices of transaction service provider system 102). In some non-limiting embodiments or aspects, one or more of the steps of implementation 500 may be performed (e.g., completely, partially, and/or the like) by another system, another device, another group of systems, or another group of devices, separate from or including transaction service provider system 102, such as issuer system 104, customer device 106, merchant system 108, acquirer system 110, and/or the like.

As shown in FIG. 5, at step 502, process 500 may include receiving, by mapping database 422 (e.g., from a user and/or a computing device of the user) custom field data associated with a plurality of custom fields (e.g., fields of parsed data from at least one of the parser nodes of the parsing system, which may have custom (e.g., unique, vendor-specific, and/or the like) formatting), as described herein.

As shown in FIG. 5, at step 504, policy database 424 may receive (e.g., from a user and/or a computing device of the user) aggregation policy data associated with at least one aggregation policy, as described herein.

As shown in FIG. 5, at step 506, mapping database 422 may generate a respective mapping between each respective custom field of the plurality of custom fields and a respective common field of a plurality of common fields (e.g., fields selected by at least one entity associated with the aggregation system, which may have common (e.g., selected, preferred, standardized, universal, and/or the like) formatting), as described herein.

As shown in FIG. 5, at step 508, aggregation system 414 may subscribe to data (e.g., lower layer data, higher layer data, and/or the like) from third queue 412, as described herein.

As shown in FIG. 5, at step 510, third queue 412 may publish (and/or have published therein from packet capture system 402 and/or parsing system 410) data (e.g., lower layer data, higher layer data, and/or the like), as described herein. Additionally or alternatively, aggregation system 414 may consume the data from third queue 412, as described herein.

As shown in FIG. 5, at step 512, mapping database 422 may communicate the mapping(s) between the custom field(s) and the common field(s) to aggregation system 414. Additionally or alternatively, aggregation system 414 may retrieve (e.g., read, request, and/or the like) the mappings from mapping database 422.

As shown in FIG. 5, at step 514, policy database 424 may communicate the aggregation policy data to aggregation system 414. Additionally or alternatively, aggregation system 414 may retrieve (e.g., read, request, and/or the like) the aggregation policy data from policy database 424.

As shown in FIG. 5, at step 516, aggregation system 414 may filter at least one field of at least one packet (e.g., a first packet) and/or the data (e.g., higher layer data, lower layer data, and/or the like) associated therewith based on the aggregation policy (or policies), as described herein. Additionally or alternatively, aggregation system 414 may add (e.g., generate and/or append) at least one field to the data associated with at least one packet (e.g., the first packet, a second packet, and/or the like) based on the aggregation policy (or policies), as described herein. Additionally or alternatively, aggregation system 414 may combine at least two fields of at least one packet (e.g., the first packet, the second packet, a third packet, and/or the like) and/or the data associated therewith based on the aggregation policy (or policies), as described herein.

As shown in FIG. 5, at step 518, aggregation system 414 may translate at least some of (e.g., at least one custom field of) the lower layer data and/or the higher layer data (e.g., at least one of the data link layer data, the network layer data, the transport layer data, the session layer data, the presentation layer data, the application layer data, any combination thereof, and/or the like) for at least one packet (e.g., a first packet) based on the respective mapping of the respective custom field(s) to the respective common field(s), as described herein.

As shown in FIG. 5, at step 520, aggregation system 414 may aggregate the lower layer data with the higher layer data (e.g., as filtered and/or translated) for each packet, as described herein.

As shown in FIG. 5, at step 520, aggregation system 414 may store the aggregated data (e.g., lower layer data aggregated with the higher layer data) for each packet in database 416, as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:
   parsing, by a packet capture system, lower layer data from each packet of a plurality of packets;
   communicating, by the packet capture system, a respective payload of each respective packet of the plurality of packets to at least one first queue;
   routing, by a routing system, the respective payload of each respective packet of the plurality of packets to a respective second queue of a plurality of second queues based on a respective protocol of the respective packet;
   parsing, by a respective protocol parser node of a parsing system, higher layer data from the respective payload of each respective packet from each respective second queue of the plurality of second queues, wherein the higher layer data comprises data associated with at least one layer higher than the lower layer data in a multi-layer protocol;
   communicating, by the packet capture system, the lower layer data for each packet of the plurality of packets to a third queue; and
   communicating, by the parsing system, the higher layer data for each packet of the plurality of packets to the third queue.

2. The method of claim 1, wherein the packet capture system comprises at least one first server, the routing system comprises at least one second server, the parsing system comprises a plurality of third servers, and each respective protocol parser node comprises a respective third server of the plurality of third servers.

3. The method of claim 2, wherein each first server of the at least one first server comprises a packet capture subsystem, a lower layer parser subsystem, and a protocol identifier subsystem,
   wherein receiving the plurality of packets comprises receiving, by the packet capture subsystem, the plurality of packets,
   wherein parsing the lower layer data from each packet comprises parsing, by the lower layer parser subsystem, the lower layer data from each packet of the plurality of packets, and
   wherein communicating the respective payload of each respective packet of the plurality of packets to the at least one first queue comprises:
      determining, by the protocol identifier subsystem, the respective protocol of each respective packet of the plurality of packets; and
      communicating, by the packet capture system, the respective payload of each respective packet of the plurality of packets with protocol data associated with the respective protocol of the respective packet to the at least one first queue.

4. The method of claim 3, wherein each respective protocol parser node of the parsing system is associated with a respective protocol of a plurality of protocols,
   wherein each respective second queue of the plurality of second queues is associated with one respective protocol parser node of the parsing system, and
   wherein routing each respective packet of the plurality of packets to the respective second queue of the plurality of second queues comprises routing each respective packet of the plurality of packets to a selected one of the plurality of second queues based on the protocol data of the respective packet corresponding to the respective protocol of the one respective protocol parser node associated with the selected one of the plurality of second queues.

5. The method of claim 1, further comprising:
   aggregating, by an aggregation system, the lower layer data for each packet with the higher layer data for each packet; and
   storing, in a database, the lower layer data for each packet aggregated with the higher layer data for each packet.

6. The method of claim 5, further comprising:
   generating, by the packet capture system, a respective packet identifier for each respective packet of the plurality of packets,
   wherein communicating the respective payload of each respective packet of the plurality of packets to at least one first queue comprises communicating the respective payload of each respective packet of the plurality of packets with the respective packet identifier of the respective packet,
   wherein communicating the lower layer data for each packet of the plurality of packets to the third queue comprises communicating the lower layer data for each packet of the plurality of packets with the respective packet identifier of the respective packet to the third queue,
   wherein communicating the higher layer data for each packet of the plurality of packets to the third queue comprises communicating the higher layer data for each packet of the plurality of packets with the respective packet identifier of the respective packet to the third queue, and
   wherein aggregating the lower layer data for each packet with the higher layer data for each packet comprises aggregating the lower layer data for each packet with the higher layer data for each packet based on the respective packet identifier of the respective packet communicated with the lower layer data matching the respective packet identifier of the respective packet communicated with the higher layer data.

7. The method of claim 5, further comprising:
receiving, by a mapping database, custom field data associated with a plurality of custom fields; and
generating, by the mapping database, a respective mapping between each respective custom field of the plurality of custom fields and a respective common field of a plurality of common fields,
wherein aggregating comprises translating at least one of the lower layer data or the higher layer data for a first packet of the plurality of packets based on the respective mapping of the respective custom field associated with the at least one of the lower layer data or the higher layer data to the respective common field.

8. The method of claim 5, further comprising:
receiving, by a policy database, aggregation policy data associated with at least one aggregation policy,
wherein aggregating comprises filtering at least one field of a first packet of the plurality of packets based on the at least one aggregation policy.

9. The method of claim 1, further comprising:
subscribing, by the routing system, to topics of the first queue, each respective topic of the topics associated with a respective protocol of a plurality of protocols,
wherein communicating the respective payload of each respective packet of the plurality of packets to at least one first queue comprises publishing, in the first queue, each respective payload of each respective packet of the plurality of packets with the respective topic of the topics based on the respective protocol of the respective packet.

10. The method of claim 9, wherein routing the respective payload of each respective packet of the plurality of packets comprises publishing, in the respective second queue of the plurality of second queues, the respective payload of each respective packet of the plurality of packets based on the respective topic of the respective packet, and
wherein parsing higher layer data from the respective payload of each respective packet comprises consuming, by the respective protocol parser node of the parsing system, the respective payload of each respective packet from each respective second queue of the plurality of second queues.

11. The method of claim 1, further comprising:
monitoring, by a resource monitoring system, the packet capture system, the routing system, the parsing system, the first queue, the plurality of second queues, and the third queue to provide respective metrics for each of the packet capture system, the routing system, the parsing system, the first queue, the second queue, and the third queue; and
determining, by a node provisioning system, whether to add or remove a node from at least one of the packet capture system, the routing system, or the parsing system based on at least one of the respective metrics for the packet capture system, the respective metrics for the routing system, the respective metrics for the parsing system, the respective metrics for the first queue, the respective metrics for the second queue, or the respective metrics for the third queue.

12. The method of claim 11, wherein at least one of:
the resource monitoring system comprises a packet capture system monitoring agent and the node provisioning system comprises a packet capture system node provisioning system;
the resource monitoring system comprises a first queue monitoring agent and a routing system monitoring agent and the node provisioning system comprises a routing system node provisioning system; or
the resource monitoring system comprises a second queue monitoring agent and a parsing system monitoring agent and the node provisioning system comprises a parsing system node provisioning system.

13. A system comprising:
a packet capture system comprising at least one hardware processor configured to:
parse lower layer data from each packet of a plurality of packets;
communicate a respective payload of each respective packet of the plurality of packets to at least one first queue; and
communicate the lower layer data for each packet of the plurality of packets to a third queue;
a routing system comprising at least one hardware processor configured to route the respective payload of each respective packet of the plurality of packets to a respective second queue of a plurality of second queues based on a respective protocol of the respective packet; and
a parsing system comprising a plurality of protocol parser nodes, each respective protocol parser node comprising at least one hardware processor configured to:
parse higher layer data from the respective payload of each respective packet from each respective second queue of the plurality of second queues, wherein the higher layer data comprises data associated with at least one layer higher than the lower layer data in a multi-layer protocol; and
communicate the higher layer data for each packet of the plurality of packets to the third queue.

14. The system of claim 13, wherein the packet capture system comprises at least one first server, the routing system comprises at least one second server, the parsing system comprises a plurality of third servers, and each respective protocol parser node comprises a respective third server of the plurality of third servers.

15. The system of claim 14, wherein each first server of the at least one first server comprises a packet capture subsystem, a lower layer parser subsystem, and a protocol identifier subsystem,
wherein receiving the plurality of packets comprises receiving, by the packet capture subsystem, the plurality of packets,
wherein parsing the lower layer data from each packet comprises parsing, by the lower layer parser subsystem, the lower layer data from each packet of the plurality of packets, and
wherein communicating the respective payload of each respective packet of the plurality of packets to the at least one first queue comprises:
determining, by the protocol identifier subsystem, the respective protocol of each respective packet of the plurality of packets; and
communicating, by the packet capture system, the respective payload of each respective packet of the plurality of packets with protocol data associated with the respective protocol of the respective packet to the at least one first queue.

16. The system of claim 15, wherein each respective protocol parser node of the parsing system is associated with a respective protocol of a plurality of protocols,
- wherein each respective second queue of the plurality of second queues is associated with one respective protocol parser node of the parsing system, and
- wherein routing each respective packet of the plurality of packets to the respective second queue of the plurality of second queues comprises routing each respective packet of the plurality of packets to a selected one of the plurality of second queues based on the protocol data of the respective packet corresponding to the respective protocol of the one respective protocol parser associated with the selected one of the plurality of second queues.

17. The system of claim 13, further comprising an aggregation system configured to:
- aggregate the lower layer data for each packet with the higher layer data for each packet; and
- store, in a database, the lower layer data for each packet aggregated with the higher layer data for each packet.

18. The system of claim 17, further comprising:
- a mapping database configured to:
  - receive custom field data associated with a plurality of custom fields; and
  - generate a respective mapping between each respective custom field of the plurality of custom fields and a respective common field of a plurality of common fields; and
- a policy database configured to receive aggregation policy data associated with at least one aggregation policy,
- wherein aggregating comprises translating at least one of the lower layer data or the higher layer data for a first packet of the plurality of packets based on the respective mapping of the respective custom field associated with the at least one of the lower layer data or the higher layer data to the respective common field, and
- wherein aggregating comprises filtering at least one field of a first packet of the plurality of packets based on the at least one aggregation policy.

19. The system of claim 13, further comprising:
- a resource monitoring system configured to monitor the packet capture system, the routing system, the parsing system, the first queue, the plurality of second queues, and the third queue to provide respective metrics for each of the packet capture system, the routing system, the parsing system, the first queue, the second queue, and the third queue; and
- a node provisioning system configured to determine whether to add or remove a node from at least one of the packet capture system, the routing system, or the parsing system based on at least one of the respective metrics for the packet capture system, the respective metrics for the routing system, the respective metrics for the parsing system, the respective metrics for the first queue, the respective metrics for the second queue, or the respective metrics for the third queue.

20. A computer program product comprising at least one non-transitory computer-readable medium including one or more instructions that, when executed by at least one processor, cause the at least one processor to:
- parse lower layer data from each packet of the plurality of packets;
- communicate a respective payload of each respective packet of the plurality of packets to at least one first queue;
- route the respective payload of each respective packet of the plurality of packets to a respective second queue of a plurality of second queues based on a respective protocol of the respective packet;
- parse higher layer data from the respective payload of each respective packet from each respective second queue of the plurality of second queues, wherein the higher layer data comprises data associated with at least one layer higher than the lower layer data in a multi-layer protocol;
- communicate the lower layer data for each packet of the plurality of packets to a third queue; and
- communicate the higher layer data for each packet of the plurality of packets to the third queue.

* * * * *